(12) United States Patent
Andon et al.

(10) Patent No.: US 12,342,822 B2
(45) Date of Patent: Jul. 1, 2025

(54) PESTICIDES AND METHODS OF USE THEREOF

(71) Applicant: Attune Agriculture LLC, Boca Raton, FL (US)

(72) Inventors: Gregory C. Andon, Sag Harbor, NY (US); Edwin Quattlebaum, Boca Raton, FL (US); Maureen L. Akins, Boca Raton, FL (US)

( * ) Notice: Subject to any disclaimer, the term of this patent is extended or adjusted under 35 U.S.C. 154(b) by 882 days.

(21) Appl. No.: 17/265,787

(22) PCT Filed: Aug. 2, 2019

(86) PCT No.: PCT/US2019/044855
§ 371 (c)(1),
(2) Date: Feb. 3, 2021

(87) PCT Pub. No.: WO2020/028779
PCT Pub. Date: Feb. 6, 2020

(65) Prior Publication Data
US 2021/0161142 A1    Jun. 3, 2021

Related U.S. Application Data

(60) Provisional application No. 62/714,461, filed on Aug. 3, 2018.

(51) Int. Cl.
*A01N 43/90* (2006.01)
*A01N 25/06* (2006.01)
*A01N 43/16* (2006.01)

(52) U.S. Cl.
CPC ............. *A01N 43/90* (2013.01); *A01N 25/06* (2013.01); *A01N 43/16* (2013.01)

(58) Field of Classification Search
None
See application file for complete search history.

(56) References Cited

U.S. PATENT DOCUMENTS

| | | | | |
|---|---|---|---|---|
| 5,089,266 A | * | 2/1992 | Lee | A01M 1/14 424/407 |
| 2006/0008495 A1 | | 1/2006 | Newman | |
| 2015/0250166 A1 | | 9/2015 | Goldblum et al. | |
| 2018/0255772 A1 | * | 9/2018 | Flemmens | A01P 5/00 |

FOREIGN PATENT DOCUMENTS

WO     2017049141 A1     3/2017

OTHER PUBLICATIONS

Kar, Carbohydrate Polymers, vol. 40, Issue 4, Dec. 1999, pp. 277-284. (Year: 1999).*
Manitoba, Leafhopper, internet article available in 2016 from the internet archive, https://web.archive.org/web/20161229215856/https://www.gov.mb.ca/agriculture/crops/insects/leafhopper.html. (Year: 2016).*
Authorized Officer: Lee W. Young, International Search Report and the Written Opinion, International Patent Application No. PCT/US2019/044855, Completed Sep. 27, 2019. 7 pp.

* cited by examiner

*Primary Examiner* — Layla D Berry
(74) *Attorney, Agent, or Firm* — Steven Scott Lloyd

(57) ABSTRACT

The invention described herein is that of novel pesticides for aerial field application with low toxicity and environmental impact. The invention leverages the physical characteristics of hydrocolloids—particularly gums and preferably natural gums—to reduce to practice the sprayable pesticide formulation described herein. The rheological properties of the pesticides allow exit from industrial spray nozzles under pressure and subsequent coalescence of fine droplets into droplets of sufficient size and adhesiveness act as sticky traps for small insects that encounter the droplets on the target foliage. The pesticides are unique in the sense that they do not include environmentally harmful chemicals and are not harmful to ecosystems and life. Rather, the pesticides of the present invention trap target pests such as small soft-bodied insects and arachnids in place such that they become immobilized eventually die.

13 Claims, 12 Drawing Sheets

PESTICIDES AND METHODS OF USE THEREOF

CROSS-REFERENCE TO RELATED APPLICATIONS

This application is a National Stage patent application of International Patent Application No. PCT/US2019/044855, filed Aug. 2, 2019, which claims the benefit of priority of U.S. Provisional Patent App. 62/714,461, filed Aug. 3, 2018, the contents of which are incorporated by reference herein in their entirety.

STATEMENT REGARDING FEDERALLY SPONSORED RESEARCH AND DEVELOPMENT

This invention was conceived and reduced to practice without the benefit of federal funding.

BACKGROUND OF THE INVENTION

Many active pesticidal ingredients, particularly insecticides, have inherent shortcomings as they may have adverse effects on the environment to which they are applied, and their use is strictly regulated by government agencies such as the U.S. Environmental Protection Agency (EPA) and its foreign counterparts. For example, organophosphates, a dominant class of insecticides in the global market, have been scrutinized due to their toxicity to humans and other animals besides the targeted insects, with some products being deregistered by the EPA for some or all uses. This has led to the development of initiatives such as organic farming, which while leading to localized reductions in environmentally harmful chemical applications, also leads to higher food costs for consumers. Thus, there is an emerging market for nontoxic alternatives to many traditionally applied classes of insecticides and other pesticides.

It is important to note that a significant advantage of gum-based pesticide formulations is that such formulations are much more environmentally friendly than those typically contained in existing commercial products. The gums employed in the present invention are nontoxic and biodegradable, unlike many commercial chemical pesticides. Damage to waterways and many fragile ecosystems resulting from the use of certain pesticides has gained the attention of activist groups as well as the EPA in recent years, and has led to cancellation of several pesticide registrations with the EPA, as well as augmentation of the EPA's list of restricted use products, which imposes legal limits on the use of certain classes of pesticides due to their environmental impact profiles. The European Food Safety Authority (EFSA) has also weighed in on the harm done by certain insecticides to bee populations and recognized this problem as a serious environmental concern.

Many commercial crops suffer from being targeted by various pests, including many insect and arachnid species, as sources of food, shelter, mating sites or sites for transmission of pathogenic microbes. By way of illustration, the global insecticides market is estimated to reach nearly $20 billion within the next five years, owing to factors such as a reduction in arable land area per capita and growth in the agricultural industry. Growth in the global human population currently outpaces global food production, particularly in developing countries. Thus, the need has grown over time for methods farmers can use to increase crop production per acre through the use of pesticides such as herbicides, fungicides, insecticides and acaricides, as well as formulation additives that improve the effectiveness of active ingredients, while balancing the effectiveness of commercially available ingredients with the need to reduce their environmental impacts.

BRIEF SUMMARY OF THE INVENTION

The invention described herein relates to the field of crop protection; more specifically to pesticides, and in a preferred embodiment to pesticidal adhesive compositions and methods of use thereof to protect crops against insects, mites and other pests that adversely affect crop production and are susceptible to control by the compositions. The applicant has utilized low levels of certain hydrocolloids, preferably gums, in aqueous solution to formulate the pesticides described herein. In preferred embodiments of the invention, the hydrocolloids are gums, which are harmless to the environment and exhibit rheological properties that enable spray application of the pesticidal adhesive compositions to target crops using currently available crop protection equipment and infrastructures while allowing for deposition of adequately viscous, adhesive droplets on target crops. The viscosity and adhesive characteristics of the droplets deposited allow for the entrapment of small soft-bodied insects and other susceptible pests for permanent immobilization and kill.

The applicant has discovered through extensive research and testing that certain hydrocolloids, preferably gums and more preferably natural gums and combinations thereof, with or without additional components, exhibit pesticidal activity when sprayed on target crops. In preferred embodiments, the compositions described herein exhibit insecticidal activity when sprayed on target crops infested with certain small insects, including but not limited to aphids, psyllids, and lygus bugs, as well as small arthropods such as mites. The applicant has observed that the compositions described herein, applied as spray droplets to target crops, exhibit a unique combination of surface tension, viscosity and rheology that allows small insects to enter the droplets but not exit. The adhesive properties of the droplets allow for adhesion to target crops as well as small insects and the like that encounter them.

The physical characterization of the pesticidal adhesive compositions described herein is essentially two-fold: First, the outer surface tension of the adhesive droplets as applied to target crops is such that crop pests, and particularly small insects, may penetrate the outer surface of the droplets, for example, by inserting one or more appendages into one or more droplets. Second, the rheology of the compositions described herein is such that back pressure may be applied to the compositions in liquid form at certain viscosities that allow for flow through standard agricultural spray equipment (deformation) and subsequent return to static viscosities, which allows for adhesion to target crops and contributes to the ability of the spray droplets to trap small insects and the like. The g-force required for such small insects and mites, for example, to remove inserted appendages from the droplets is more than these pests can exert, leaving them trapped by the droplets.

The compositions of the present invention with their newly discovered potential for controlling certain pests in the field comprise aqueous preparations of certain gums and blends thereof. Gums are hydrocolloids derived primarily from various plant materials or microbial fermentation processes. They are water soluble, nontoxic and less harmful to the environment than many traditional classes of chemicals used in crop protection. While the applicant has observed that these hydrocolloids are effective as pesticidal adhesives when applied to target crops at relatively low concentrations, they may be applied at higher usage levels for improved effectiveness as compared to existing pesticides, the application rates of which are limited through environmental regulations to avoid adverse environmental impacts.

Gums are polysaccharides and glycoproteins that bind and order water in a way that allows them to remain in uniform solution across a range of concentrations. These unique characteristics of the gums enabled the applicant to formulate sprayable pesticidal adhesives that resist evaporation and runoff in the field and are environmentally friendly. In the context of the embodiments disclosed herein, the capacity of certain gums and gum combinations to bind and order water allows for increased or maintained viscosities of solutions, as well as a relatively high surface tension of the spray droplets, enabling them to remain substantially globular while adhered to a target surface such as a leaf of an infested plant, without flattening out or evaporating. This feature teaches away particularly from the utilization of surfactants, which tend to lower surface tension.

The gums of preferred embodiments maintain uniform consistency by remaining in solution without settling out, which lends to predictability in spray applications. In certain example embodiments, the gums used in the pesticidal adhesive compositions described herein are xanthan gum, a fermentation product of *Xanthamonis campestris* bacteria, and konjac, a substance derived from the dried corm of the konjac plant that largely comprises glucomannan. While xanthan gum and konjac can independently build viscosity in aqueous solution while remaining dissolved, the combination of these two gums can build the viscosity of an aqueous solution much more than either gum alone when the same total amount of both gums is added to the solution. Accordingly, in certain example embodiments, the pesticidal adhesive composition comprises or consists essentially of xanthan gum and konjac added in a 1:1 ratio to aqueous solvent.

Previous attempts have been made to incorporate hydrocolloids into pesticidal formulations, but not without the addition of other chemicals that are toxic or at some level harmful to the environment where they are applied. Examples of such additives include surfactants, cosolvents, attractants, preservatives and coloring agents that are synthetic and not necessarily biodegradable. It is an object of the present invention to exclude environmentally harmful chemicals from the compositions described herein and rely primarily or exclusively on the properties of hydrocolloids, and preferably gums or combinations thereof, in solution, to achieve sprayable pesticidal adhesive formulations that can be applied to target crops and control their infestation with a variety of pests. It is possible, however, that certain examples of the classes of additives alluded to in this paragraph may not increase the environmental impact of exemplary compositions and may be used to modulate the properties of the compositions.

DETAILED DESCRIPTION OF THE INVENTION

Figure 1:
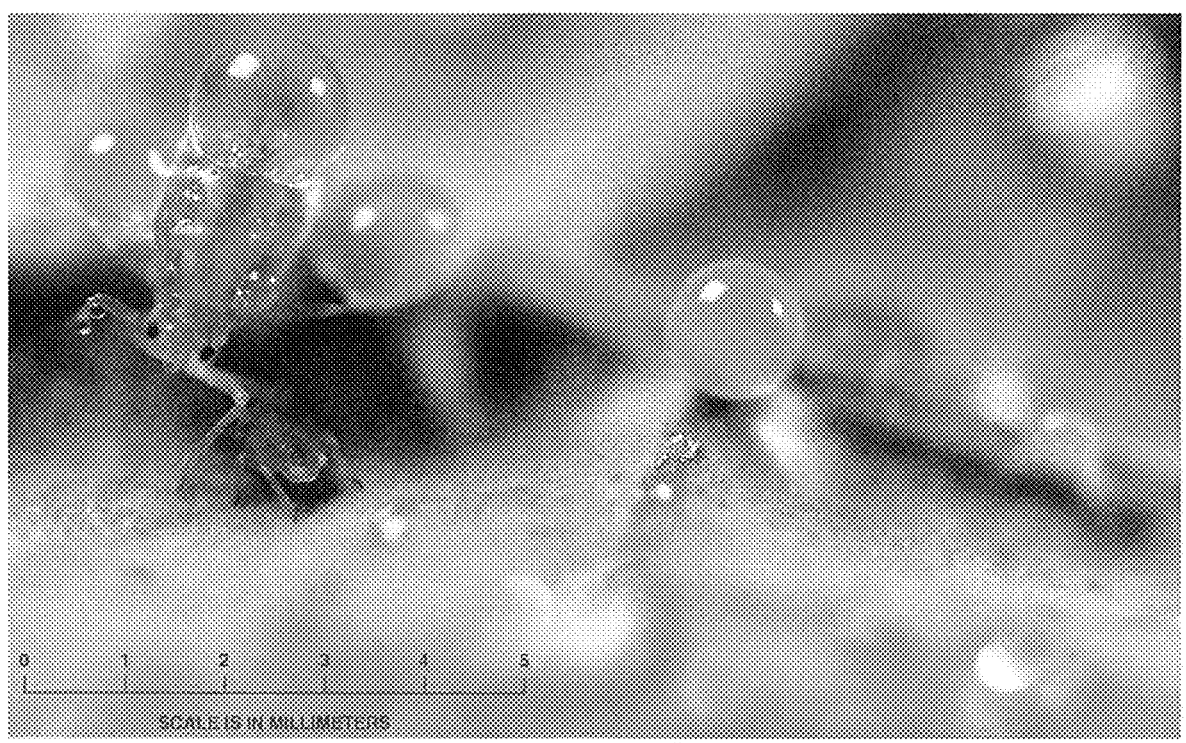
FIG. 1 shows aphids immobilized on a broccoli leaf after encountering a pesticide of the present invention. A size scale is provided in the lower left corner.
Figure 2:
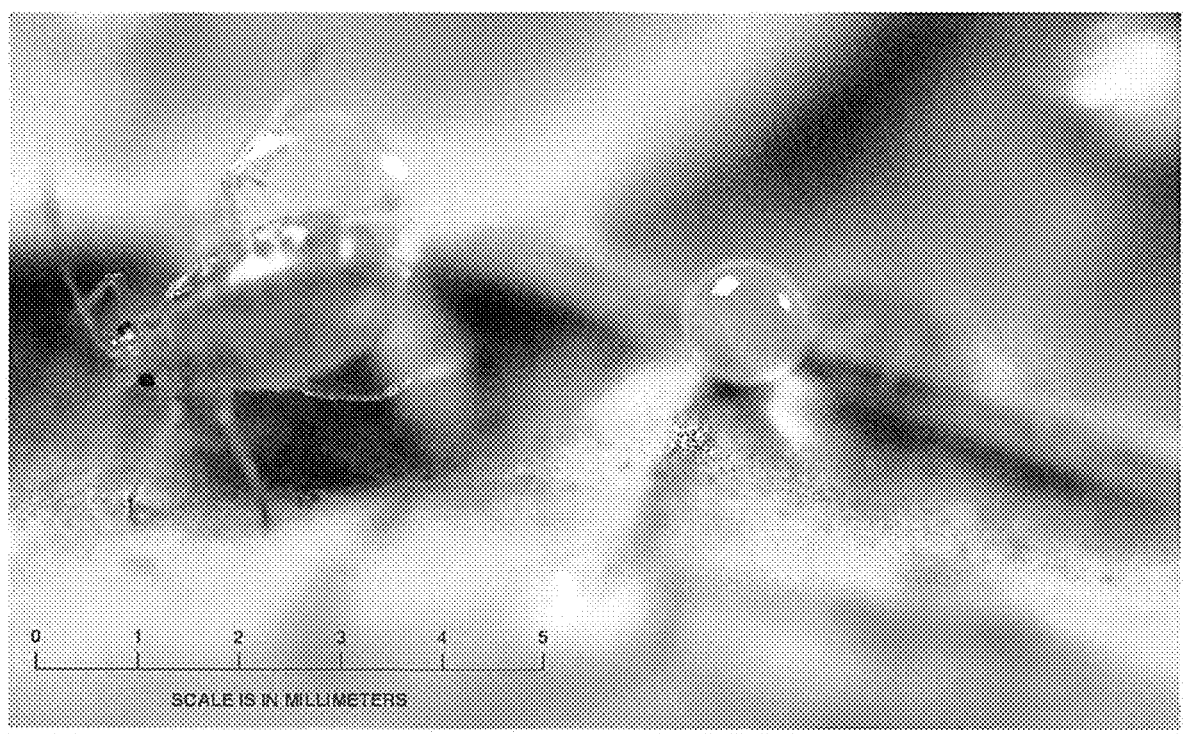
FIG. 2 shows aphids immobilized on a broccoli leaf after meeting a pesticide of the present invention. A size scale is provided in the lower left corner.
Figure 3:
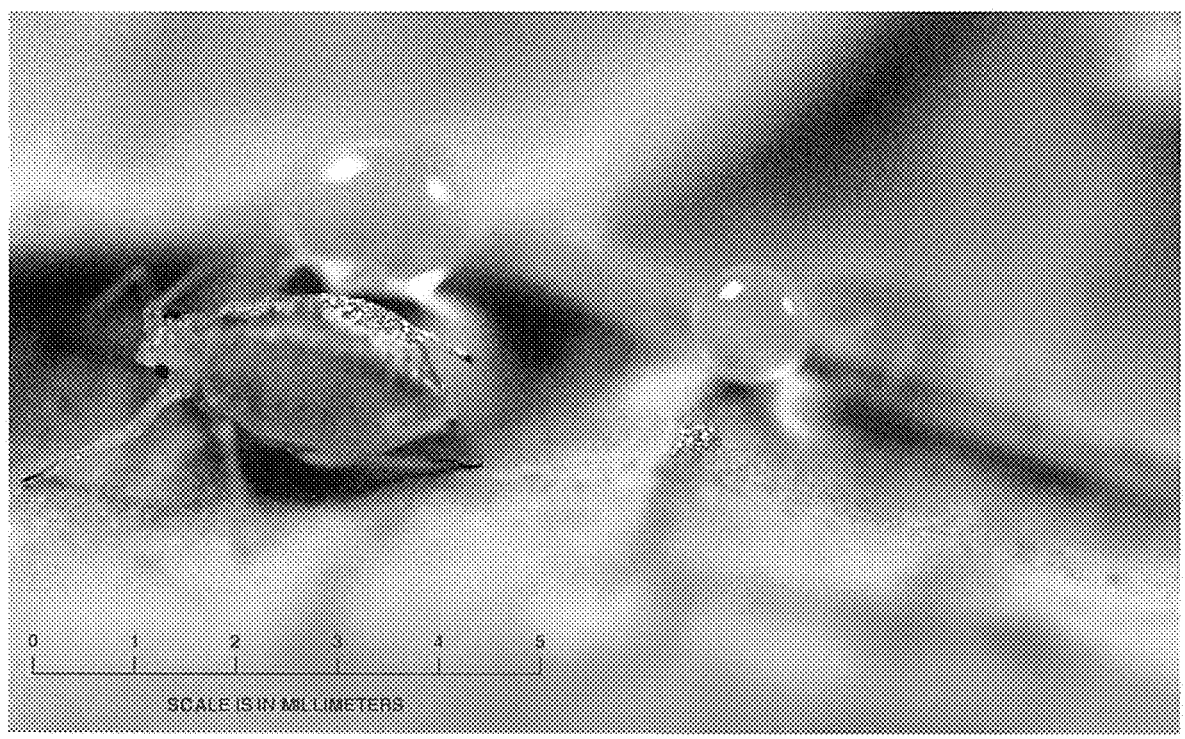
FIG. 3 shows aphids immobilized on a broccoli leaf after meeting a pesticide of the present invention. A size scale is provided in the lower left corner.
Figure 4:
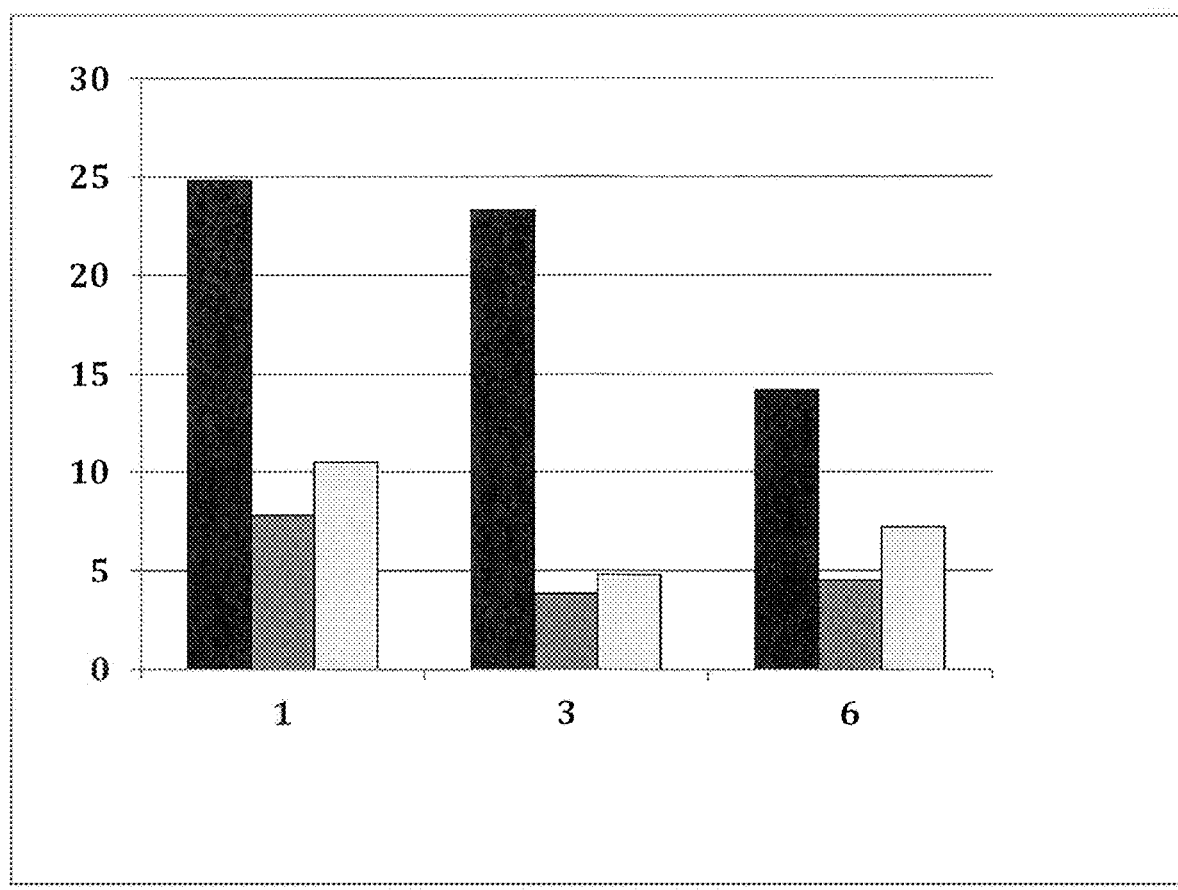
FIG. 4 represents a reduction in the average number of green peach aphid adults on broccoli plants sprayed with various concentrations of an aqueous composition comprising a 1:1 blend of xanthan gum and konjac (0.25%) (light gray bars), compared to untreated controls (black bars) and Assail 30 SG (gray bars), a commercially available acetamiprid insecticide, under controlled greenhouse conditions. Aphids were counted at 1, 3 and 6 days post-treatment.
Figure 5:
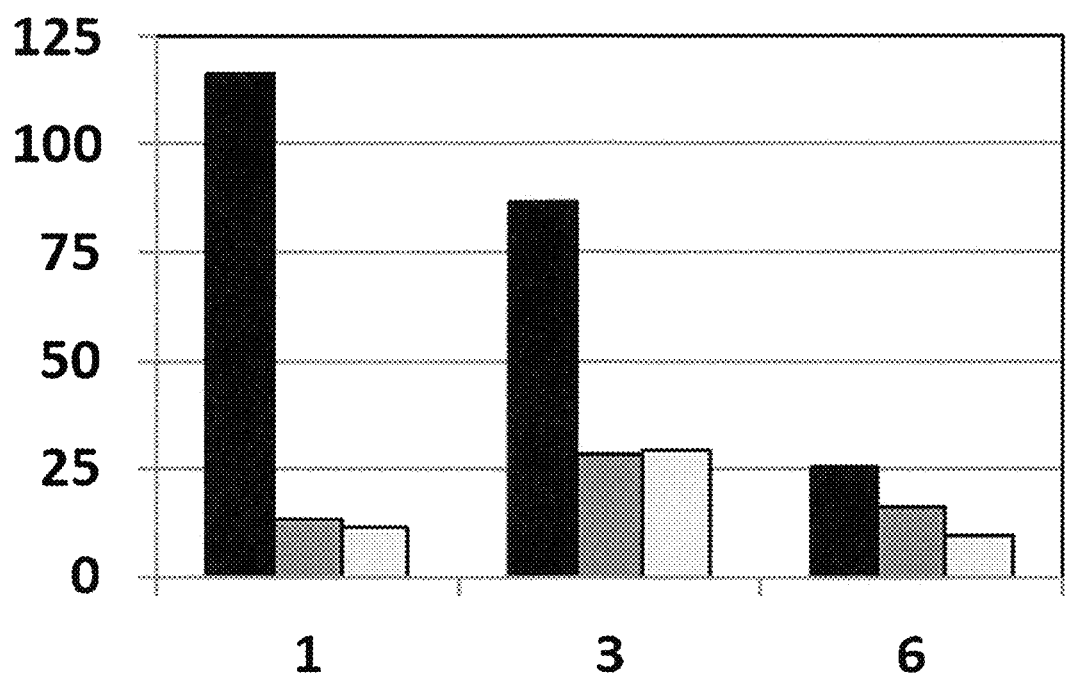
FIG. 5 represents a reduction in the average number of green peach aphid adults on broccoli plants sprayed with various concentrations of an aqueous composition comprising a 1:1 blend of xanthan gum and konjac (0.25%) (light gray bars), compared to untreated controls (black bars) and Assail 30 SG (gray bars), a commercially available acetamiprid insecticide, in the field. Aphids were counted at 1, 3 and 6 days post-treatment.
Figure 6:
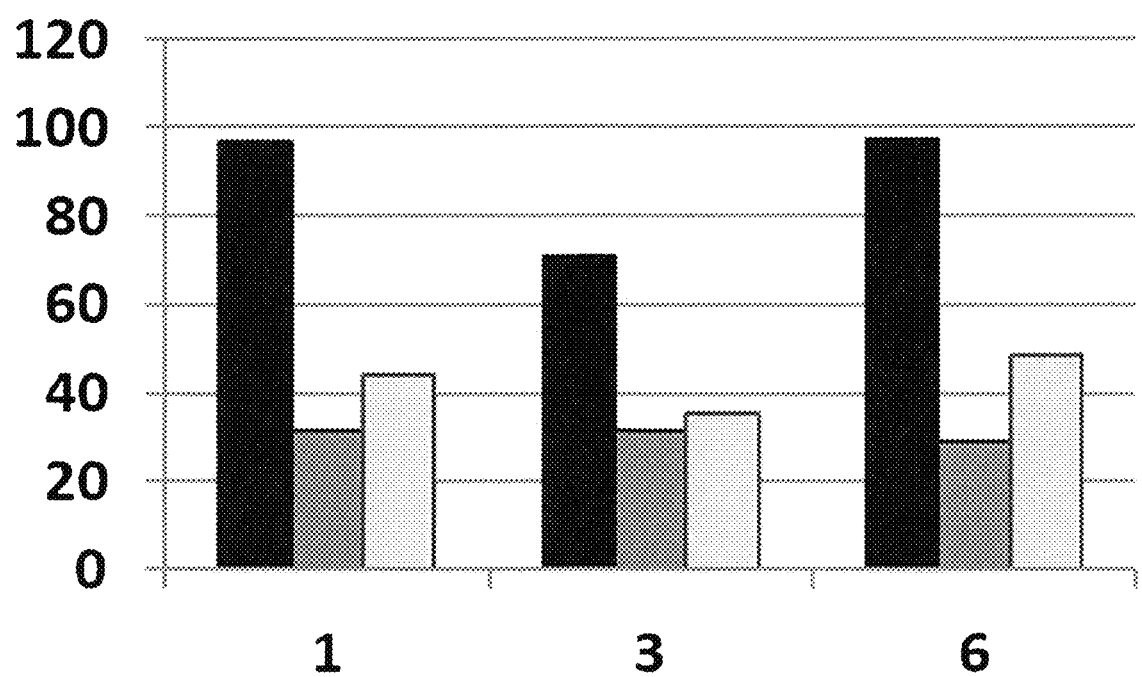
FIG. 6 shows a reduction in the average number of green peach aphid nymphs on broccoli plants sprayed with various concentrations of an aqueous composition comprising a 1:1 blend of xanthan gum and konjac (0.25%) (light gray bars), compared to untreated controls (black bars) and Assail 30 SG (gray bars), a commercially available acetamiprid insecticide, under controlled greenhouse conditions. Aphids were counted at 1, 3 and 6 days post-treatment.
Figure 7:
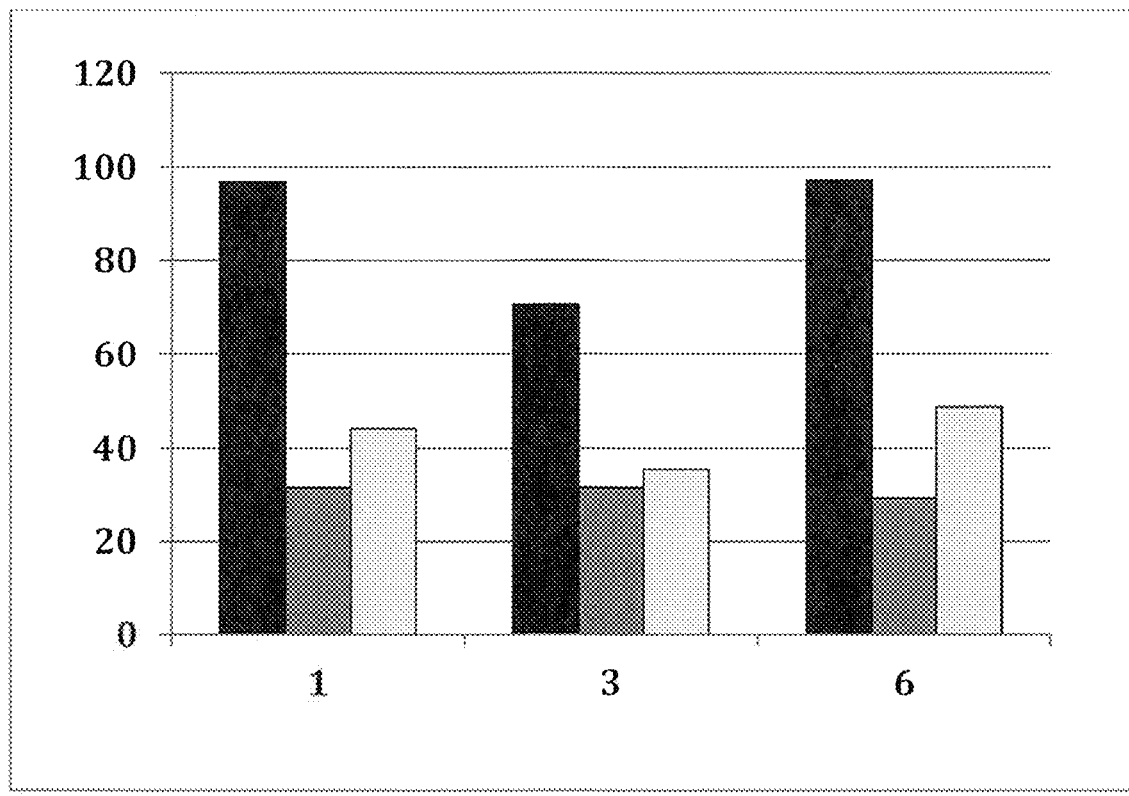
FIG. 7 shows a reduction in the average number of green peach aphid nymphs on broccoli plants sprayed with various concentrations of an aqueous composition comprising a 1:1 blend of xanthan gum and konjac (0.25%) (light gray bars), compared to untreated controls (black bars) and Assail 30 SG (gray bars), a commercially available acetamiprid insecticide, in the field. Aphids were counted at 1, 3 and 6 days post-treatment.

The invention described herein is focused on methods of controlling crop pests, for example and not by way of limitation certain small insects or arachnids, that have deleterious effects on crops. The pesticidal adhesive formulations described herein work particularly well when applied to crops infested with small, soft-bodied insects such as those of the suborder Sternorrhyncha, as well as small arachnids such as those of the taxon Acari. The applicant has studied in detail what happens to certain target pests that encounter the pesticidal adhesives using high-resolution video technology, and has demonstrated that gums in aqueous solution, when applied to infested crops, kill the insects by one or more means, including but not limited to full or partial immobilization, exhaustion and suffocation.

Control of the target pests with the gum-based pesticidal adhesives described herein is achieved using methods that have very low environmental impact. The various gum components described herein are water-soluble and non-toxic; indeed, many gum products are used in human food and animal feed for various purposes. The compositions described herein, which may be applied to target crops at relatively low concentrations, are not harmful to other organisms even when applied at higher concentrations, making them more attractive than most pesticides currently being used by the global agricultural industry. For example, many insecticides such as neonicotinoids, currently applied to the environment to control crop pests, are harmful to off-target organisms such as bees, making these products an undesirable pest control alternative to the present invention.

In exemplary embodiments, the invention described herein is directed to methods of controlling aphids, spider mites, psyllids and lygus bugs on host plants by immobilization, exhaustion, suffocation or a combination thereof, which occurs when the pests encounter spray droplets containing the pesticidal adhesives described herein. These small plant pests are a major problem for farmers of many crops such as pecans, broccoli, cotton and bell peppers, among others. Aphids, for example, are sap-sucking insects that have successfully colonized food and fiber crops and reduced yields through host plant consumption as well as the transmission of plant viruses. There are hundreds of species of aphids and they are among the most destructive crop pests in temperate growing regions, and very difficult to control. The effectiveness of the pesticidal adhesive compositions described herein in controlling aphids, for example, will illustrate the novelty and utility of the invention to one of ordinary skill in the art.

In its preferred embodiments, the invention described herein is that of pesticidal adhesive compositions consisting essentially of one or more gums in aqueous solution within a concentration range allowing for spray application of the compositions to target crops using preexisting means of application. Methods of spray application include but are not limited to application using a handheld spray apparatus, a spray apparatus affixed to a tractor or equivalent for row crop spraying, or aerial application such as by an airplane-mounted spray apparatus, as well as high-pressure blast applications such as those employed to control citrus crop pests. It is an important feature of the invention that the rheological properties of the pesticidal adhesive compositions are such that pressures that will be appreciated by those of ordinary skill in the art will be applied to the compositions to propel them through one or more spray nozzles (which will also be familiar to those of ordinary skill in the art) in a manner that allows for acceptable target crop coverage. For example, back pressures ranging from 15 to 175 pounds per square inch (psi) are common to the types of apparatuses referenced above. Thus, it is a further advantage of the present invention that special equipment is not necessary to practice the methods described herein for applying the pesticidal adhesive compositions for use in combating plant-feeding insects and Acari, including but not limited to those mentioned in the preceding paragraph.

Figure 8:
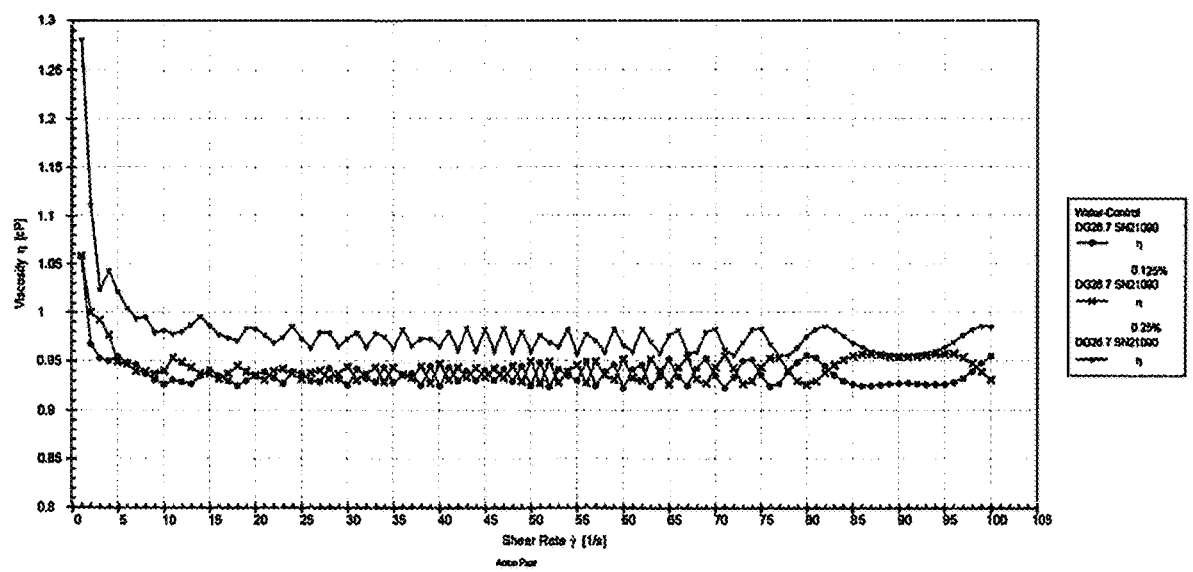
FIG. 8 shows a flow curve for compositions comprising a 1:1 ratio of xanthan gum to konjac in aqueous solvent at various concentrations. A flow curve is derived from multiple viscosity measurements taken over time in response to increasing shear force.
Figure 9:
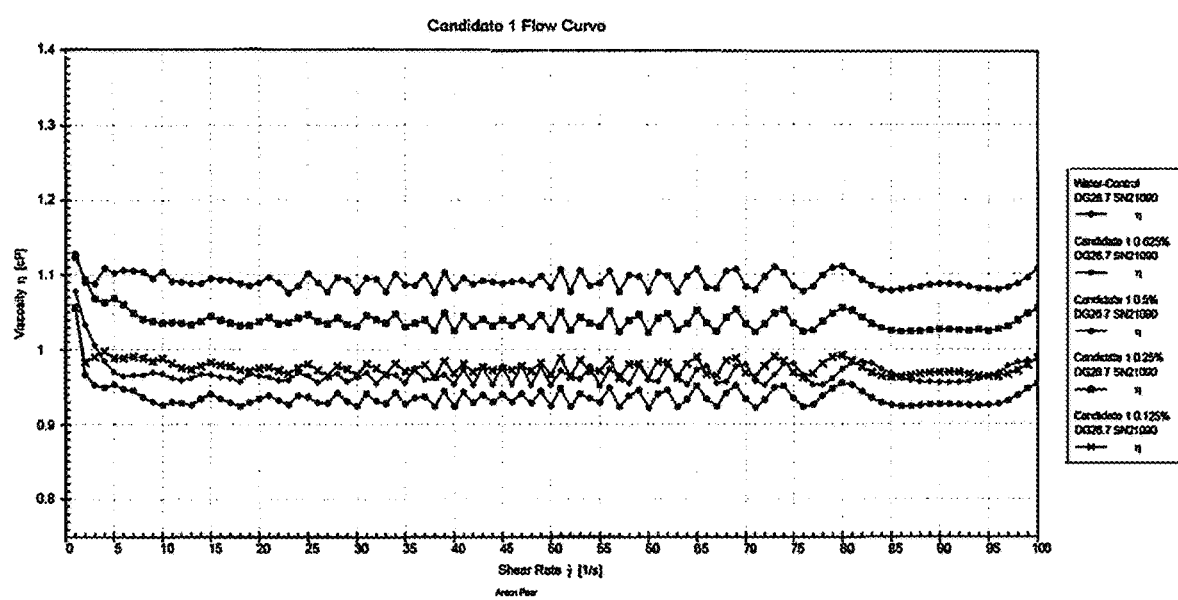
FIG. 9 shows a flow curve for compositions comprising a 4:1 ratio of gum Arabic to carboxymethyl cellulose in aqueous solvent at various concentrations. A flow curve is derived from multiple viscosity measurements taken over time in response to increasing shear force.
Figure 10:
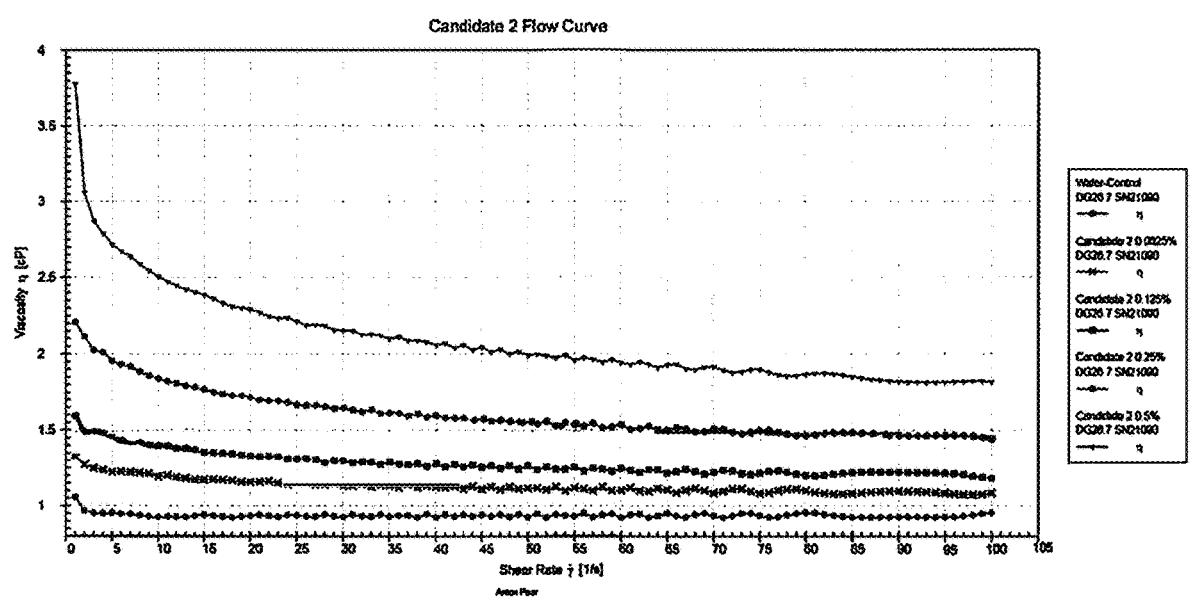
FIG. 10 shows a flow curve for compositions comprising a 7:5:1 ratio of gum Arabic to xanthan gum to hydroxypropyl methylcellulose in aqueous solvent at various concentrations. A flow curve is derived from multiple viscosity measurements taken over time in response to increasing shear force.
Figure 11:
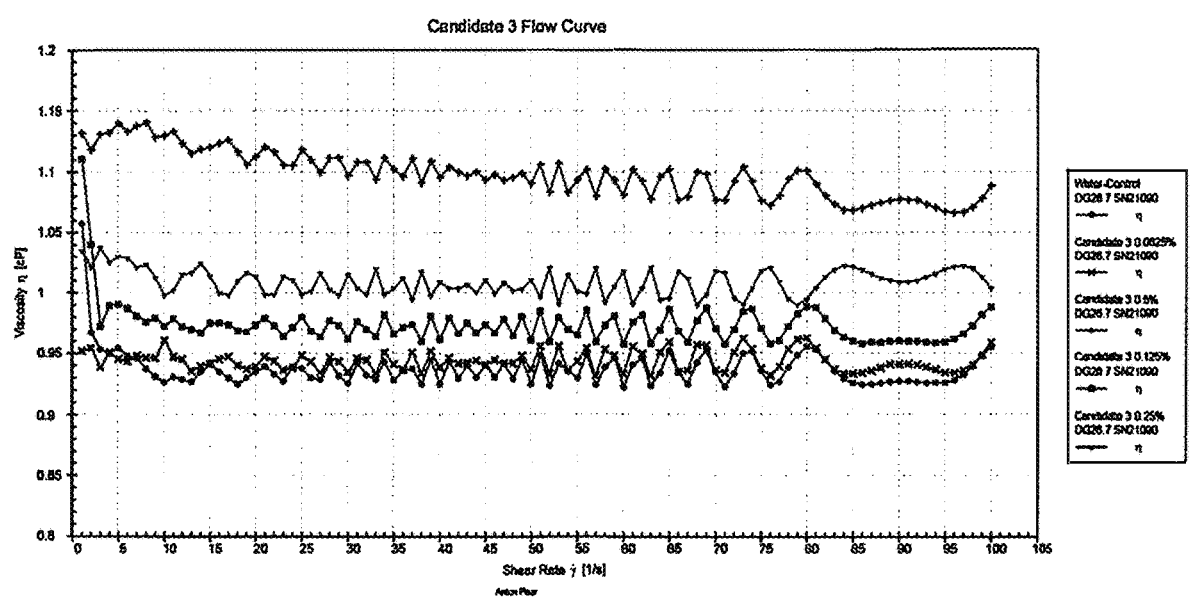
FIG. 11 shows the relative stickiness of several formulations of the pesticidal adhesive concentrates described herein, measured as force (g·m·s$^2$) required to remove an object from the substance tested.
Figure 12:
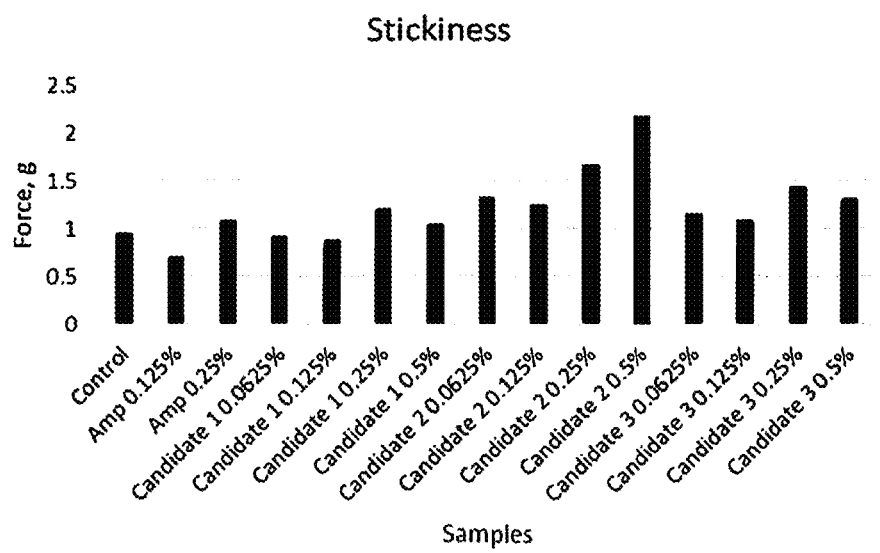
FIG. 12 shows the relative stickiness of several formulations of the pesticidal adhesive concentrates described herein, measured as the g-force required to remove an object from the substance tested. The compositions tested are those represented by the flow curves of FIGS. 9-11.

It is a further benefit of the invention that while the rheological properties of the pesticidal adhesive compositions described herein are capable of spray application as is common in the art, they also exhibit time-dependent viscosity, or "thixotropy". For example, in exemplary embodiments, the pesticidal adhesive compositions described herein are prepared as concentrates that are to be diluted by users (i.e., farm workers) into a large tank of aqueous solvent to arrive at a prescribed "tank mix" concentration for spray application. Each of the concentrate and the tank mix will have a single point viscosity. When sprayed through a nozzle under pressure to a target crop area, the single point viscosity of the tank mix will reduce in response to the shear forces applied as it exits the nozzle (see FIGS. 8-11). After leaving the nozzle, however, the spray droplets will coalesce and the viscosity will increase by the time the droplets land on the targeted crops. This is important as the viscosity of the formulation used is one of the characteristics that must be managed to assure the pesticidal adhesive composition deposits well and adheres to the target crop for a period adequate to allow for a target pest such as an aphid to encounter a droplet. Thus, a key attribute of the invention is that users may select tank mix concentrations for application that are most suitable to the equipment being used for application, the desired residence time of the droplets on the target crop, and the desired level of coverage by the spray droplets, using viscosity as an indicator. Table 1 lists a few sample ranges of concentrations (of pesticidal adhesive concentrates) along with the viscosity and pH of each of the concentrates tested.

As discussed above, single-point viscosity measurements during the formulation process are useful for developing alternative formulations of the pesticidal adhesive compositions described herein when compared against analogous data to formulations previously measured and then tested in greenhouse or field trials with various spray applicators. As also mentioned above, many of the gums and combinations thereof considered for use in the formulation of the pesticidal adhesives display thixotropic properties that make them particularly suitable for the purposes of the present invention. In order to study how candidates might perform in terms of time-dependent viscosity reduction in response to shear force, flow curves were generated, whereby the various candidate formulations were subjected to increasing shear forces over time and the effect on viscosity was measured. FIGS. 8-11 provide comparisons of certain candidates against water that were used in the selection process for optimized preparation of the pesticidal adhesives described herein.

TABLE 1

| Gums | Ratio | % (w/v) | Viscosity (cps) | pH |
|---|---|---|---|---|
| Xanthan gum:konjac | 1:1 | 0.125 | 1.6 | 4.3 |
| | | 0.25 | 1.9 | 4.37 |
| Gum Arabic:carboxymethyl-cellulose | 4:1 | 0.0625 | 2.5 | 6.42 |
| | | 0.125 | 2.6 | 6.42 |
| | | 0.25 | 2.6 | 6.43 |
| | | 0.5 | 2.6 | 6.45 |
| Gum Arabic:xanthan gum hydroxypropyl methylcellulose | 7.5:1:1 | 0.0625 | 2.7 | 4.95 |
| | | 0.125 | 2.8 | 4.78 |
| | | 0.25 | 3.2 | 4.45 |
| | | 0.5 | 3.6 | 4.38 |

In certain embodiments of the invention described herein, two or more gums in combination exhibit greater effectiveness than any gum alone in terms of the applicant's performance requirements. In the embodiment tested most extensively, the gums used in combination are selected from the group consisting of xanthan gum and konjac. In certain example embodiments, the pesticidal adhesive composition invented by the applicant consists essentially of a 1:1 blend of xanthan gum and konjac, dissolved in aqueous solvent to an appropriate level for use as a concentrate from which a tank mix may be prepared at the site of use. In certain embodiments, the pesitcidal adhesive concentrate comprises or consists essentially of a 1:1 blend of xanthan gum and konjac present in aqueous solvent at a concentration of 0.125-0.25% and is further diluted to a final tank mix concentration ranging from 0.0375-0.15% for spray application. The concentrate and tank mix percentages referenced herein represent weight/volume (w/v) percentages in solution unless otherwise specified.

The dilution rates, or "usage rates" for the pesticidal adhesive compositions (tank mixes) described herein will vary based on the type of application means, the target plant or crop, the time of application, and other environmental factors such as temperature and humidity, and can be appropriately selected by one of ordinary skill in the art. In certain example embodiments, the usage rate is between approximately 1 ounce/100 gallons of final solution to approximately 4 gallons/100 gallons of final solution. In certain example embodiments, the usage rate is between approximately 1 pint/100 gallons to 1 quart/100 gallons of final application solution.

The application parameters for administration of the final application solution will depend on the application mechanism and can be appropriately selected by one of ordinary skill in the art. For aerial application, the flow rate is typically at 5-25 gallons per acre (gpa). Vehicle (typically truck or tractor) mounted applications are typically at 25 gpa but may range between 10-150 gpa. Handheld applications typically range from 100 to 250 gpa. Backpack sprayer applications are typically at 30-100 gpa. Pressure ranges are typically spray nozzle and application type dependent and can be appropriately selected by one of ordinary skill in the art. Typical pressure ranges are 15-115 pounds per square inch of back pressure. The gum-based insecticides disclosed herein benefit further from a significant reduction in off-target spray drift by virtue of the increased percentage of droplets per volume that are 100 microns in diameter or greater compared to water when sprayed at pressures up to 40 psi compared to water, with performance being comparable to the commercial standards tested.

The preferred embodiments of the invention described herein must exhibit the adhesive properties explained as providing for their mechanism of action as pesticides, and especially insecticides effective against small, soft-bodied insects, arachnids and the like, for example, those of less than 5 millimeters (mm) in body length. It is difficult to pinpoint the precise level of "adhesiveness" the spray droplets of the tank mix, once sprayed on a target crop area, must exhibit to be effective at immobilizing or otherwise controlling the target pests, and the requirements may vary based on the size and strength of the pest to be immobilized. In all instances, however, the average g-force required for an object to be removed from the pesticidal adhesive concentrates described herein may be measured. As used herein, the more g-force required for a test object to be removed (the "removal force"), the "stickier" the formulation tested. FIG. 12 is a graphic representation of the "stickiness" of several compositions tested. In the case of targeting aphids and similarly sized pests as described above, the applicant has successfully utilized pesticidal adhesive concentrates with stickiness requiring a removal force of even less than 1 g to prepare tank mixes useful in controlling the pests through entrapment (i.e., immobilization) and subsequent death of the pests. It is noted that larger insect species such as bees can free themselves from droplets they may encounter.

The embodiments disclosed herein represent novel pesticidal adhesive compositions comprising or consisting essentially of gums as active ingredients effective at immobilizing, exhausting and possibly suffocating crop pests, for example, small insect and arachnid pests such as aphids, psyllids, lygus bugs and spider mites. A major benefit of the present invention is low environmental impact stemming from the water solubility and biodegradability of the active ingredients compared to many common chemical pesticides and a reduction of the amount and cost of active ingredient required to cover a given acreage. These benefits result in positive environmental effects by reducing the amount of non-biodegradable and potentially hazardous chemicals released into the environment due to measures taken by agricultural and related industries to control pests and improve crop yields.

The reduced environmental impact of the pesticidal adhesives described herein is due in large part to the fact that they are not toxic to biological organisms; rather the spray droplets applied to target crops according to the methods of the present invention become sticky traps useful for immobilizing the pests. For example, FIG. 1 shows an aphid stuck in a pesticidal adhesive droplet as disclosed herein. Video footage revealed to the applicant that the insect is unable to pull free of the droplet, effectively becoming immobilized, which limits its ability to move around the plant and feed and may also result in physical exhaustion of the insect as it tries to pull free, or the loss of trapped appendages. It may also be that the pesticidal adhesives clog the respiratory channels of the target pests and impair their ability to breath, leading to suffocation. Either postulated modality causes death, which was demonstrated in greenhouse and field trials as shown in FIGS. 4-7.

These methods of control are much different than those of more commonly used pesticides currently used in agriculture, and the most illustrative examples of toxic chemicals applied to control pests are insecticides. For example, many insecticides target the nervous system of the insect; i.e., they are by definition neurotoxins. Insects share some common nervous system characteristics with other life forms, and thus chemicals that are insect neurotoxins may also affect higher organisms such as mammals by blocking sodium channels or inhibiting enzymes involved in neurotransmission. Indeed, many insecticides have been regulated out of the market for these reasons, although some remain. Even those chemical insecticides that do not target the nervous system may target other important biological mechanisms such as muscular calcium channels.

Exemplary Compositions

Some of the pesticidal adhesive compositions comprise blends of gums that demonstrate markedly different characteristics than each individual gum alone. Table 2 lists some example embodiments of dry gum blends tested by the applicants and the range of useful ratios in terms of dry weight. In the context of the embodiments disclosed herein, the capacity of certain gums and gum combinations to interact with water allows for increased or maintained viscosities. Additionally, certain gums and gum combinations exhibit the rheological characteristics required to ensure relatively large droplets (i.e., >100 mm) can be formed when the solution is sprayed. Thus, the dry gums and gum blends prepared by the applicants were added to aqueous solvents at the concentrations recited throughout the application in preparation of useful gum-based pesticides.

TABLE 2

Ranges of Dry Blend Ratios for Selected Gum Blends

| Blend | Range of Ratios |
|---|---|
| Xanthan gum:Konjac | 1:6 to 6:1 |
| Carrageenan:MC | 1:4 to 4:1 |
| MC:Sodium alginate | 1:4 to 4:1 |
| CMC:MC | 1:6 to 6:1 |
| MC:Konjac | 1:4 to 4:1 |
| MC:Guar gum | 1:6 to 4:1 |
| MC:Xanthan gum | 1:4 to 4:1 |
| MC:Pectin | 1:2 to 2:1 |
| Carrageenan:HPMC | 1:4 to 4:1 |
| HPMC:Sodium alginate | 1:4 to 4:1 |
| CMC:HPMC | 1:6 to 2:1 |
| HPMC:Konjac | 1:4 to 4:1 |
| HPMC:Guar gum | 1:6 to 4:1 |
| HPMC:Xanthan gum | 1:4 to 4:1 |
| HPMC:Pectin | 1:8 to 8:1 |
| Carrageenan:PGA | 1:3 to 4:1 |
| CMC:PGA | 1:8 to 8:1 |
| PGA:Konjac | 1:4 to 4:1 |
| PGA:Guar gum | 1:6 to 4:1 |
| PGA:Xanthan gum | 1:4 to 4:1 |
| PGA:Pectin | 1:8 to 8:1 |
| Gum acacia:Xanthan gum | 3:2 to 12:1 |
| MGA:Xanthan gum | 3:2 to 12:1 |

In certain example embodiments, the dry gum blend consists essentially of xanthan gum and konjac in a 1:6, 1:3, 1:2, 2:3, 5:6, 1:1, 6:5, 3:2, 2:1, 3:1, or 6:1 ratio, respectively. In certain example embodiments, the dry gum blend consists essentially of or consists of carrageenan and MC in a 1:4, 1:2, 3:4, 1:1, 4:3, 2:1, or 4:1 ratio, respectively. In certain example embodiments, the dry gum blend consists essentially of or consists of MC and sodium alginate in a 1:4, 1:2, 3:4, 1:1, 4:3, 2:1, or 4:1 ratio, respectively. In certain example embodiments, the dry gum blend consists essentially of or consists of CMC and MC in 1:6, 1:3, 1:2, 2:3, 5:6, 1:1, 6:5, 3:2, 2:1, 3:1, or 6:1 ratio, respectively. In certain example embodiments, the dry gum blend consists essentially of or consists of MC and konjac in a 1:4, 1:2, 3:4, 1:1, 4:3, 2:1, or 4:1 ratio, respectively. In certain example embodiments, the dry gum blend consists essentially of or consists of MC and guar gum, in a 1:6, 1:3, 1:2, 2:3, 5:6, 1:1, 6:5, 3:2, 2:1, 3:1, 6:1, 5:4, 5:3, 5:2, 5:1, 4:3, or 4:1, ratio respectively. In one example embodiment, the dry gum blend consists essentially of or consists of MC and xanthan gum in a 1:4, 1:2, 3:4, 1:1, 4:3, 2:1, or 4:1 ratio, respectively. In certain example embodiments, the dry gum blend consists essentially of or consists of MC and pectin in a 1:2, 1:1, or 2:1 ratio, respectively. In certain example embodiments, the dry gum blend consists essentially of or consists of carrageenan and HPMC in a 1:4, 1:2, 3:4, 1:1, 4:3, 2:1, or 4:1 ratio, respectively. In certain example embodiments, the dry gum blend consists essentially of or consists of HPMC and sodium alginate in a 1:4, 1:2, 3:4, 1:1, 4:3, 2:1, or 4:1 ratio, respectively. In certain example embodiments, the dry gum blend consists essentially of or consists of CMC and HPMC in a 1:6, 1:3, 1:2, 2:3, 5:6, 1:1, 6:5, 3:2, or 2:1 ratio, respectively. In certain example embodiments, the dry gum blend consists essentially of or consists of HPMC and konjac in a 1:4, 1:2, 3:4, 1:1, 4:3, 2:1, or 4:1 ratio, respectively. In certain example embodiments, the dry gum blend consists essentially of or consists of HPMC and guar gum in a 1:6, 1:3, 1:2, 2:3, 5:6, 1:1, 6:5, 3:2, 2:1, 3:1, 6:1, 5:4, 5:3, 5:2, 5:1, 4:3, or 4:1, ratio respectively. In certain example embodiments, the dry gum blend consists essentially of or consists of HPMC and xanthan gum in a 1:4, 1:2, 3:4, 1:1, 4:3, 2:1, or 4:1 ratio, respectively. In certain example embodiments, the dry gum blend consists essentially of or consists of HPMC and pectin in a 1:8, 1:4, 3:8, 1:2, 5:8, 3:4, 7:8, 1:1, 8:7, 4:3, 8:5, 2:1, 8:3, 4:1, or 8:1 ratio, respectively. In certain example embodiments, the dry gum blend consists essentially of or consists of carrageenan and PGA in a 1:3, 2:3, 1:1, 3:2, 3:1, 4:3, 2:1, or 4:1 ratio, respectively. In certain example embodiments, the dry gum blend consists essentially of or consists of CMC and PGA in a 1:8, 1:4, 3:8, 1:2, 5:8, 3:4, 7:8, 1:1, 8:7, 4:3, 8:5, 2:1, 8:3, 4:1, or 8:1 ratio, respectively. In certain example embodiments, the dry gum blend consists essentially of or consists of PGA and konjac in a 1:4, 1:2, 3:4, 1:1, 4:3, 2:1, or 4:1 ratio, respectively. In certain example embodiments, the dry bum blend consists essentially of or consists of PGA and guar gum in 1:6, 1:3, 1:2, 2:3, 5:6, 1:1, 6:5, 3:2, 2:1, 3:1, 6:1, 5:4, 5:3, 5:2, 5:1, 4:3, or 4:1, ratio respectively. In certain example embodiments, the dry gum blend consists essentially of or consists of PGA and xanthan gum in a 1:4, 1:2, 3:4, 1:1, 4:3, 2:1, or 4:1 ratio, respectively. In certain example embodiments, the dry gum blend consists essentially of or consists of PGA and pectin in a 1:8, 1:4, 3:8, 1:2, 5:8, 3:4, 7:8, 1:1, 8:7, 4:3, 8:5, 2:1, 8:3, 4:1, or 8:1 ratio, respectively. In certain example embodiments, the dry gum blend consists essentially of or consists of gum acacia and xanthan gum in a 3:2, 3:1, 1:1, 4:3, 2:1, 4:1, 5:4, 5:3, 5:2, 5:1, 6:5, 3:1, 6:1, 7:6, 7:5, 7:4, 7:3, 7:2, 7:1, 8:7, 8:5, 8:3, 8:1, 9:8, 9:7, 9:5, 9:4, 9:2, 9:1, 10:9, 10:8, 10:3, 10:1, 11:10, 11:9, 11:8, 11:7, 11:6, 11:5, 11:4, 11:3, 11:2, 11:1, 12:11, 12:7, 12:5, or 12:1, ratio respectively. In certain example embodiments, the dry gum blend consists essentially of or consists of modified gum Arabic (MGA) and xanthan gum in a 3:2, 3:1, 1:1, 4:3, 2:1, 4:1, 5:4, 5:3, 5:2, 5:1, 6:5, 3:1, 6:1, 7:6, 7:5, 7:4, 7:3, 7:2, 7:1, 8:7, 8:5, 8:3, 8:1, 9:8, 9:7, 9:5, 9:4, 9:2, 9:1, 10:9, 10:8, 10:3, 10:1, 11:10, 11:9, 11:8, 11:7, 11:6, 11:5, 11:4, 11:3, 11:2, 11:1, 12:11, 12:7, 12:5, or 12:1, ratio respectively.

In certain example embodiments, the gums may include gum acacia, MGA, guar gum, cellulosics, xanthan gum, konjac, carrageenans, alginates and pectin. As used throughout this disclosure, the term "approximately" is used to indicate concentrations that are the exact value In certain example embodiments, the xanthan gum and konjac blend is added to an aqueous solvent at a concentration of approximately 0.1% to approximately 2.5%, approximately 0.1% to approximately 1%, approximately 0.1% to approximately 0.9%, approximately 0.1% to approximately 0.8%, approximately 0.1% to approximately 0.7%, approximately 0.1% to approximately 0.6%, approximately 0.1% to approximately 0.5%, approximately 0.1% to approximately 0.4%, approximately 0.1% to approximately 0.3%, approximately 0.1% to approximately 0.2%, approximately 1% to approximately 2.5%, approximately 1% to approximately 2.4%, approximately 1% to approximately 2.3%, approximately 1% to approximately 2.2%, approximately 1% to approximately 2.1%, approximately 1% to approximately 2.0%, approximately 1% to approximately 1.9%, approximately 1% to approximately 1.8%, approximately 1% to approximately 1.7%, approximately 1% to approximately 1.6%, approximately 1% to approximately 1.5%, approximately 1% to approximately 1.4%, approximately 1% to approximately 1.3%, approximately 1% to approximately 1.2%, approximately 1% to approximately 1.1%, approximately 2.0% to approximately 2.5%, approximately 2.0% to approximately 2.4%, or approximately 2.0% to approximately 2.3%, approximately 2.0% to approximately 2.2%, approximately 2.0% to approximately 2.1%.

In certain example embodiments, the adjuvant composition comprises carboxymethyl cellulose (CMC) and hydroxypropyl methylcellulose (HPMC), polysaccharides derived from insoluble cellulose fibers extracted from cotton linters or wood pulp that are etherified with carboxymethyl or hydroxypropyl methyl groups, respectively, to create a soluble fiber. The resulting cellulose ethers provide unique rheological characteristics in aqueous solutions including varying levels of viscosity development, film formation capability, and in the case of HPMC, temperature induced gelation. In one example embodiment, the adjuvant composition comprises, consists essentially of or consists of CMC and HPMC. In certain example embodiments, CMC and HPMC are added in a 1:1 to ratio.

In certain example embodiments, the CMC and HPMC blend is added to an aqueous solvent at a concentration of approximately 5% to approximately 20%, approximately 5% to approximately 19%, approximately 5% to approximately 18%, approximately 5% to approximately 17%, approximately 5% to approximately 16%, approximately 5% to approximately 15%, approximately 5% to approximately 14%, approximately 5% to approximately 13%, approximately 5% to approximately 12%, approximately 5% to approximately 11%, approximately 5% to approximately 10%, approximately 5% to approximately 9%, approximately 5% to approximately 8%, approximately 5% to approximately 7%, approximately 5% to approximately 6%, approximately 6% to approximately 20%, approximately 7% to approximately 20%, approximately 8% to approximately 20%, approximately 9% to approximately 20%, 10% to approximately 20%, approximately 11% to approximately 20%, approximately 12% to approximately 20%, approximately 13% to approximately 20%, approximately 14% to approximately 20%, approximately 15% to approximately 20%, approximately 16% to approximately 20%, approximately 17% to approximately 20%, approximately 18% to approximately 20%, approximately 19% to approximately 20%, approximately 5% to approximately 19%, approximately 6% to approximately 18%, approximately 7% to approximately 17%, approximately 8% to approximately 16%, approximately 9% to approximately 15%, approximately 10% to approximately 14%, or approximately 11% to approximately 13%.

In certain example embodiments, the CMC and HPMC blend is added to an aqueous solvent at a concentration of approximately 0.1% to approximately 13%, approximately 1% to approximately 12%, approximately 1% to approximately 11%, approximately 1% to approximately 10%, approximately 1% to approximately 9%, approximately 1% to approximately 8%, approximately 1% to approximately 7%, approximately 1% to approximately 6%, approximately 1% to approximately 5%, approximately 1% to approximately 4%, approximately 1% to approximately 3%, approximately 1% to approximately 2%, approximately 0.1% to approximately 1%, approximately 0.1% to approximately 0.9%, approximately 0.1% to approximately 0.8%, approximately 0.1% to approximately 0.7%, approximately 0.1% to approximately 0.6%, approximately 0.1% to approximately 0.5%, approximately 0.1% to approximately 0.4%, approximately 0.1% to approximately 0.3%, approximately 0.1% to approximately 0.2%, approximately 1% to approximately 1.5%, approximately 1% to approximately 1.4%, approximately 1% to approximately 1.3%, approximately 1% to approximately 1.2%, or approximately 1% to approximately 1.1%. In certain example embodiments, the resulting adjuvant composition may further comprise gum acacia, added at a concentration of approximately 5% to approximately 15%, approximately 5% to approximately 14%, approximately 5% to approximately 13%, approximately 5% to approximately 12%, approximately 5% to approximately 11%, approximately 5% to approximately 10%, approximately 5% to 9%, approximately 5% to approximately 8%, approximately 5% to approximately 7%, approximately 5% to approximately 6%, approximately 6% to approximately 15%, approximately 7% to approximately 15%, approximately 8% to approximately 15%, approximately 9% to approximately 15%, approximately 10% to approximately 15%, approximately 11% to approximately 15%, approximately 12% to approximately 15%, approximately 13% to approximately 15%, or approximately 14% to approximately 15%.

In another example embodiment, gums used in the adjuvant composition are carrageenan and propylene glycol alginate (PGA). Carrageenan, derived from various species in of red seaweed, are polysaccharides with a wide variety of viscosity and gel forming characteristics. PGA, derived from various species of brown seaweed, is the reaction product of propylene oxide and alginic acid.

In certain example embodiments, the adjuvant composition comprises, consists essentially of or consists of carrageenan and PGA. In certain example embodiments, the carrageenan and PGA are added in a 1:1 ratio. In certain example embodiments, the carrageenan and PGA blend is added to an aqueous solvent at a concentration of approximately 5% to approximately 30%, approximately 5% to approximately 29%, approximately 5% to approximately 28%, approximately 5% to approximately 27%, approximately 5% to approximately 26%, approximately 5% to approximately 25%, approximately 5% to approximately 24%, approximately 5% to approximately 23%, approximately 5% to approximately 22%, approximately 5% to approximately 21%, approximately 5% to approximately 20%, approximately 5% to approximately 19%, approximately 5% to approximately 18%, approximately 5% to approximately 17%, approximately 5% to approximately 16%, approximately 5% to approximately 15%, approximately 5% to approximately 14%, approximately 5% to approximately 13%, approximately 5% to approximately 12%, approximately 5% to approximately 11%, approximately 5% to approximately 10%, approximately 5% to approximately 9%, approximately 5% to approximately 8%, approximately 5% to approximately 7%, approximately 5% to approximately 6%, approximately 6% to approximately 30%, approximately 7% to approximately 30%, approximately 8% to approximately 30% approximately 9% to approximately 30%, 10% to approximately 30%, approximately 11% to approximately 30%, approximately 12% to approximately 30%, approximately 13% to approximately 30%, approximately 14% to approximately 30%, approximately 15% to approximately 30%, approximately 16%, to approximately 30%, approximately 17% to approximately 30%, approximately 18% to approximately 30%, approximately 19% to approximately 30%, approximately 20% to approximately 30%, approximately 21% to approximately 30%, approximately 22% to approximately 30%, approximately 23% to approximately 30%, approximately 24% to approximately 30%, approximately 25% to approximately 30%, approximately 26% to approximately 30%, approximately 27% to approximately 30%, approximately 28% to approximately 30%, approximately 29% to approximately 30%, approximately 6% to approximately 29%, approximately 7% to approximately 28%, approximately 8% to approximately 27%, approximately 9% to approximately 26%, approximately 10% to approximately 25%, approximately 11% to approximately 24%, approximately 12% to approximately 23%, approximately 13% to approximately 22%, approximately 14% to approximately 21%, approximately 15% to approximately 20%, approximately 16% to approximately 19%, or approximately 17% to approximately 18%.

In certain example embodiments, the 1:1 blend of carrageenan and PGA is added at a concentration of approximately 0.1% to approximately 13%, approximately 1% to approximately 12%, approximately 1% to approximately 11%, approximately 1% to approximately 10%, approximately 1% to approximately 9%, approximately 1% to approximately 8%, approximately 1% to approximately 7%, approximately 1% to approximately 6%, approximately 1% to approximately 5%, approximately 1% to approximately 4%, 1% to approximately 3%, approximately 1% to approximately 2%, approximately 1% to approximately 1.5%, 0.1% to approximately 1%, approximately 0.1% to approximately 0.9%, approximately 0.1% to approximately 0.8%, approximately 0.1% to approximately 0.7%, approximately 0.1% to approximately 0.6%, approximately 0.1% to approximately 0.5%, approximately 0.1% to approximately 0.4%, approximately 0.1% to approximately 0.3%, approximately 0.1% to approximately 0.2%, approximately 1% to approximately 1.5%, approximately 1% to approximately 1.4%, approximately 1% to approximately 1.3%, approximately 1% to approximately 1.2%, or approximately 1% to approximately 1.1%.

In certain example embodiments, the adjuvant composition may further comprise gum acacia, added at a concentration of approximately 5% to approximately 15%, approximately 5% to approximately 14%, approximately 5% to approximately 13%, approximately 5% to approximately 12%, approximately 5% to approximately 11%, approximately 5% to approximately 10%, approximately 5% to 9%, approximately 5% to approximately 8%, approximately 5% to approximately 7%, approximately 5% to approximately 6%, approximately 6% to approximately 15%, approximately 7% to approximately 15%, approximately 8% to approximately 15%, approximately 9% to approximately 15%, approximately 10% to approximately 15%, approximately 11% to approximately 15%, approximately 12% to approximately 15%, approximately 13% to approximately 15%, or approximately 14% to approximately 15%.

In another example embodiment, the gums used in the adjuvant composition are pectin and methylcellulose (MC). Pectin, extracted from citrus peel or apple pumice, is a polysaccharide that provides viscosity, film formation, and gel characteristics. MC, made with the same base material as CMC and hydroxypropyl methylcellulose (HPMC), is cellulose etherified with methyl groups to create a soluble fiber. MC possesses a similar thermal gelation characteristic to that of HPMC and excellent film forming properties. Accordingly, in certain example embodiments, the adjuvant composition comprises pectin and MC added in a 1:1 ratio.

In one example embodiment, the adjuvant composition comprises, consists essentially of or consists of MC and pectin. In certain example embodiments, the MC and pectin are added in a 1:1 ratio. In certain example embodiments, the MC and pectin blend is added to aqueous solvent at a concentration of 5% to approximately 30%, approximately 5% to approximately 29%, approximately 5% to approximately 28%, approximately 5% to approximately 27%, approximately 5% to approximately 26%, approximately 5% to approximately 25%, approximately 5% to approximately 24%, approximately 5% to approximately 23%, approximately 5% to approximately 22%, approximately 5% to approximately 21%, approximately 5% to approximately 20%, approximately 5% to approximately 19%, approximately 5% to approximately 18%, approximately 5% to approximately 17%, approximately 5% to approximately 16%, approximately 5% to approximately 15%, approximately 5% to approximately 14%, approximately 5% to approximately 13%, approximately 5% to approximately 12%, approximately 5% to approximately 11%, approximately 5% to approximately 10%, approximately 5% to approximately 9%, approximately 5% to approximately 8%, approximately 5% to approximately 7%, approximately 5% to approximately 6%, approximately 6% to approximately 30%, approximately 7% to approximately 30%, approximately 8% to approximately 30% approximately 9% to approximately 30%, 10% to approximately 30%, approximately 11% to approximately 30%, approximately 12% to approximately 30%, approximately 13% to approximately 30%, approximately 14% to approximately 30%, approximately 15% to approximately 30%, approximately 16%, to approximately 30%, approximately 17% to approximately 30%, approximately 18% to approximately 30%, approximately 19% to approximately 30%, approximately 20% to approximately 30%, approximately 21% to approximately 30%, approximately 22% to approximately 30%, approximately 23% to approximately 30%, approximately 24% to approximately 30%, approximately 25% to approximately 30%, approximately 26% to approximately 30%, approximately 27% to approximately 30%, approximately 28% to approximately 30%, approximately 29% to approximately 30%, approximately 6% to approximately 29%, approximately 7% to approximately 28%, approximately 8% to approximately 27%, approximately 9% to approximately 26%, approximately 10% to approximately 25%, approximately 11% to approximately 24%, approximately 12% to approximately 23%, approximately 13% to approximately 22%, approximately 14% to approximately 21%, approximately 15% to approximately 20%, approximately 16% to approximately 19%, or approximately 17% to approximately 18%.

In certain example embodiments, the 1:1 blend of pectin and MC is added at a concentration of approximately 0.1% to approximately 20%, approximately 1% to approximately 20%, approximately 1% to approximately 19%, approximately 1% to approximately 18%, approximately 1% to approximately 17%, approximately 1% to approximately 16%, approximately 1% to approximately 15%, approximately 1% to approximately 14%, approximately 1% to approximately 13%, approximately 1% to approximately 12%, approximately 1% to approximately 11%, approximately 1% to approximately 10%, approximately 1% to approximately 9%, approximately 1% to approximately 8%, approximately 1% to approximately 7%, approximately 1% to approximately 6%, approximately 1% to approximately 5%, approximately 1% to approximately 4%, 1% to approximately 3%, approximately 1% to approximately 2%, approximately 1% to approximately 1.5%, 0.1% to approximately 1%, approximately 0.1% to approximately 0.9%, approximately 0.1% to approximately 0.8%, approximately 0.1% to approximately 0.7%, approximately 0.1% to approximately 0.6%, approximately 0.1% to approximately 0.5%, approximately 0.1% to approximately 0.4%, approximately 0.1% to approximately 0.3%, approximately 0.1% to approximately 0.2%, approximately 1% to approximately 1.5%, approximately 1% to approximately 1.4%, approximately 1% to approximately 1.3%, approximately 1% to approximately 1.2%, approximately 1% to approximately 1.1%.

In certain example embodiments, the adjuvant composition may further comprise gum acacia, added at a concentration of approximately 5% to approximately 15%, approximately 5% to approximately 14%, approximately 5% to approximately 13%, approximately 5% to approximately 12%, approximately 5% to approximately 11%, approximately 5% to approximately 10%, approximately 5% to 9%, approximately 5% to approximately 8%, approximately 5% to approximately 7%, approximately 5% to approximately 6%, approximately 6% to approximately 15%, approximately 7% to approximately 15%, approximately 8% to approximately 15%, approximately 9% to approximately 15%, approximately 10% to approximately 15%, approximately 11% to approximately 15%, approximately 12% to approximately 15%, approximately 13% to approximately 15%, or approximately 14% to approximately 15%.

In certain example embodiments, the adjuvant composition comprises, consists essentially of or consists of carrageenan and MC. In certain example embodiments, the carrageenan and MC are added in a 1:1 ratio. In certain example embodiments, the carrageenan and MC blend is added to aqueous solvent at a concentration of approximately 5% to approximately 20%, approximately 5% to approximately 19%, approximately 5% to approximately 18%, approximately 5% to approximately 17%, approximately 5% to approximately 16%, approximately 5% to approximately 15%, approximately 5% to approximately 14%, approximately 5% to approximately 13%, approximately 5% to approximately 12%, approximately 5% to approximately 11%, approximately 5% to approximately 10%, approximately 5% to approximately 9%, approximately 5% to approximately 8%, approximately 5% to approximately 7%, approximately 5% to approximately 6%, approximately 6% to approximately 20%, approximately 7% to approximately 20%, approximately 8% to approximately 20%, approximately 9% to approximately 20%, 10% to approximately 20%, approximately 11% to approximately 20%, approximately 12% to approximately 20%, approximately 13% to approximately 20%, approximately 14% to approximately 20%, approximately 15% to approximately 20%, approximately 16% to approximately 20%, approximately 17% to approximately 20%, approximately 18% to approximately 20%, approximately 19% to approximately 20%, approximately 5% to approximately 19%, approximately 6% to approximately 18%, approximately 7% to approximately 17%, approximately 8% to approximately 16%, approximately 9% to approximately 15%, approximately 10% to approximately 14%, or approximately 11% to approximately 13%.

In another example embodiment, the adjuvant composition comprises, consists essentially of or consists of MC and an alginate selected from the group consisting of sodium alginate, ammonium alginate, calcium alginate, PGA and combinations thereof. In certain example embodiments, the MC and the alginate are added in a 1:1 ratio. In certain example embodiments, the MC and alginate blend is added to aqueous solvent at a concentration of approximately 5% to approximately 20%, approximately 5% to approximately 19%, approximately 5% to approximately 18%, approximately 5% to approximately 17%, approximately 5% to approximately 16%, approximately 5% to approximately 15%, approximately 5% to approximately 14%, approximately 5% to approximately 13%, approximately 5% to approximately 12%, approximately 5% to approximately 11%, approximately 5% to approximately 10%, approximately 5% to approximately 9%, approximately 5% to approximately 8%, approximately 5% to approximately 7%, approximately 5% to approximately 6%, approximately 6% to approximately 20%, approximately 7% to approximately 20%, approximately 8% to approximately 20%, approximately 9% to approximately 20%, 10% to approximately 20%, approximately 11% to approximately 20%, approximately 12% to approximately 20%, approximately 13% to approximately 20%, approximately 14% to approximately 20%, approximately 15% to approximately 20%, approximately 16% to approximately 20%, approximately 17% to approximately 20%, approximately 18% to approximately 20%, approximately 19% to approximately 20%, approximately 5% to approximately 19%, approximately 6% to approximately 18%, approximately 7% to approximately 17%, approximately 8% to approximately 16%, approximately 9% to approximately 15%, approximately 10% to approximately 14%, or approximately 11% to approximately 13%.

In one example embodiment, the adjuvant composition comprises, consists essentially of or consists of CMC and MC. In certain example embodiments, the CMC and MC are added in a 1:1 ratio. In certain example embodiments, the CMC and MC blend is added to aqueous solvent at a concentration of approximately 5% to approximately 30%, approximately 5% to approximately 29%, approximately 5% to approximately 28%, approximately 5% to approximately 27%, approximately 5% to approximately 26%, approximately 5% to approximately 25%, approximately 5% to approximately 24%, approximately 5% to approximately 23%, approximately 5% to approximately 22%, approximately 5% to approximately 21%, approximately 5% to approximately 20%, approximately 5% to approximately 19%, approximately 5% to approximately 18%, approximately 5% to approximately 17%, approximately 5% to approximately 16%, approximately 5% to approximately 15%, approximately 5% to approximately 14%, approximately 5% to approximately 13%, approximately 5% to approximately 12%, approximately 5% to approximately 11%, approximately 5% to approximately 10%, approximately 5% to approximately 9%, approximately 5% to approximately 8%, approximately 5% to approximately 7%, approximately 5% to approximately 6%, approximately 6% to approximately 30%, approximately 7% to approximately 30%, approximately 8% to approximately 30% approximately 9% to approximately 30%, 10% to approximately 30%, approximately 11% to approximately 30%, approximately 12% to approximately 30%, approximately 13% to approximately 30%, approximately 14% to approximately 30%, approximately 15% to approximately 30%, approximately 16%, to approximately 30%, approximately 17% to approximately 30%, approximately 18% to approximately 30%, approximately 19% to approximately 30%, approximately 20% to approximately 30%, approximately 21% to approximately 30%, approximately 22% to approximately 30%, approximately 23% to approximately 30%, approximately 24% to approximately 30%, approximately 25% to approximately 30%, approximately 26% to approximately 30%, approximately 27% to approximately 30%, approximately 28% to approximately 30%, approximately 29% to approximately 30%, approximately 6% to approximately 29%, approximately 7% to approximately 28%, approximately 8% to approximately 27%, approximately 9% to approximately 26%, approximately 10% to approximately 25%, approximately 11% to approximately 24%, approximately 12% to approximately 23%, approximately 13% to approximately 22%, approximately 14% to approximately 21%, approximately 15% to approximately 20%, approximately 16% to approximately 19%, or approximately 17% to approximately 18%.

In one example embodiment, the adjuvant composition comprises, consists essentially of or consists of MC and konjac. In certain example embodiments, MC and konjac are added in a 1:1 to ratio. In certain example embodiments, the MC and konjac blend is added to aqueous solvent at a concentration of approximately 5% to approximately 20%, approximately 5% to approximately 19%, approximately 5% to approximately 18%, approximately 5% to approximately 17%, approximately 5% to approximately 16%, approximately 5% to approximately 15%, approximately 5% to approximately 14%, approximately 5% to approximately 13%, approximately 5% to approximately 12%, approximately 5% to approximately 11%, approximately 5% to approximately 10%, approximately 5% to approximately 9%, approximately 5% to approximately 8%, approximately 5% to approximately 7%, approximately 5% to approximately 6%, approximately 6% to approximately 20%, approximately 7% to approximately 20%, approximately 8% to approximately 20%, approximately 9% to approximately 20%, 10% to approximately 20%, approximately 11% to approximately 20%, approximately 12% to approximately 20%, approximately 13% to approximately 20%, approximately 14% to approximately 20%, approximately 15% to approximately 20%, approximately 16% to approximately 20%, approximately 17% to approximately 20%, approximately 18% to approximately 20%, approximately 19% to approximately 20%, approximately 5% to approximately 19%, approximately 6% to approximately 18%, approximately 7% to approximately 17%, approximately 8% to approximately 16%, approximately 9% to approximately 15%, approximately 10% to approximately 14%, or approximately 11% to approximately 13%.

In one example embodiment, the adjuvant composition comprises, consists essentially of or consists of MC and guar gum. In certain example embodiments, MC and guar gum are added in a 1:1 to ratio. In certain example embodiments, the MC and guar gum blend is added to aqueous solvent at a concentration of approximately 5% to approximately 30%, approximately 5% to approximately 29%, approximately 5% to approximately 28%, approximately 5% to approximately 27%, approximately 5% to approximately 26%, approximately 5% to approximately 25%, approximately 5% to approximately 24%, approximately 5% to approximately 23%, approximately 5% to approximately 22%, approximately 5% to approximately 21%, approximately 5% to approximately 20%, approximately 5% to approximately 19%, approximately 5% to approximately 18%, approximately 5% to approximately 17%, approximately 5% to approximately 16%, approximately 5% to approximately 15%, approximately 5% to approximately 14%, approximately 5% to approximately 13%, approximately 5% to approximately 12%, approximately 5% to approximately 11%, approximately 5% to approximately 10%, approximately 5% to approximately 9%, approximately 5% to approximately 8%, approximately 5% to approximately 7%, approximately 5% to approximately 6%, approximately 6% to approximately 30%, approximately 7% to approximately 30%, approximately 8% to approximately 30% approximately 9% to approximately 30%, 10% to approximately 30%, approximately 11% to approximately 30%, approximately 12% to approximately 30%, approximately 13% to approximately 30%, approximately 14% to approximately 30%, approximately 15% to approximately 30%, approximately 16%, to approximately 30%, approximately 17% to approximately 30%, approximately 18% to approximately 30%, 19% to approximately 30%, 20% to approximately 30%, approximately 21% to approximately 30%, approximately 22% to approximately 30%, approximately 23% to approximately 30%, approximately 24% to approximately 30%, approximately 25% to approximately 30%, approximately 26% to approximately 30%, approximately 27% to approximately 30%, approximately 28% to approximately 30%, approximately 29% to approximately 30%, approximately 6% to approximately 29%, approximately 7% to approximately 28%, approximately 8% to approximately 27%, approximately 9% to approximately 26%, approximately 10% to approximately 25%, approximately 11% to approximately 24%, approximately 12% to approximately 23%, approximately 13% to approximately 22%, approximately 14% to approximately 21%, approximately 15% to approximately 20%, approximately 16% to approximately 19%, or approximately 17% to approximately 18%.

In one example embodiment, the adjuvant composition comprises, consists essentially of or consists of MC and xanthan gum. In certain example embodiments, MC and xanthan gum are added in a 1:1 to ratio. In certain example embodiments MC and xanthan gum blend is added to aqueous solvent at a concentration of approximately 5% to approximately 20%, approximately 5% to approximately 19%, approximately 5% to approximately 18%, approximately 5% to approximately 17%, approximately 5% to approximately 16%, approximately 5% to approximately 15%, approximately 5% to approximately 14%, approximately 5% to approximately 13%, approximately 5% to approximately 12%, approximately 5% to approximately 11%, approximately 5% to approximately 10%, approximately 5% to approximately 9%, approximately 5% to approximately 8%, approximately 5% to approximately 7%, approximately 5% to approximately 6%, approximately 6% to approximately 20%, approximately 7% to approximately 20%, approximately 8% to approximately 20%, approximately 9% to approximately 20%, 10% to approximately 20%, approximately 11% to approximately 20%, approximately 12% to approximately 20%, approximately 13% to approximately 20%, approximately 14% to approximately 20%, approximately 15% to approximately 20%, approximately 16% to approximately 20%, approximately 17% to approximately 20%, approximately 18% to approximately 20%, approximately 19% to approximately 20%, approximately 5% to approximately 19%, approximately 6% to approximately 18%, approximately 7% to approximately 17%, approximately 8% to approximately 16%, approximately 9% to approximately 15%, approximately 10% to approximately 14%, or approximately 11% to approximately 13%.

In one example embodiment, the adjuvant composition comprises, consists essentially of or consists of carrageenan and HPMC. In certain example embodiments, carrageenan and HPMC are added in a 1:1 to ratio. In certain example embodiments, the carrageenan and HPMC blend is added to aqueous solvent at a concentration of approximately 5% to approximately 20%, approximately 5% to approximately 19%, approximately 5% to approximately 18%, approximately 5% to approximately 17%, approximately 5% to approximately 16%, approximately 5% to approximately 15%, approximately 5% to approximately 14%, approximately 5% to approximately 13%, approximately 5% to approximately 12%, approximately 5% to approximately 11%, approximately 5% to approximately 10%, approximately 5% to approximately 9%, approximately 5% to approximately 8%, approximately 5% to approximately 7%, approximately 5% to approximately 6%, approximately 6% to approximately 20%, approximately 7% to approximately 20%, approximately 8% to approximately 20%, approximately 9% to approximately 20%, 10% to approximately 20%, approximately 11% to approximately 20%, approximately 12% to approximately 20%, approximately 13% to approximately 20%, approximately 14% to approximately 20%, approximately 15% to approximately 20%, approximately 16% to approximately 20%, approximately 17% to approximately 20%, approximately 18% to approximately 20%, approximately 19% to approximately 20%, approximately 5% to approximately 19%, approximately 6% to approximately 18%, approximately 7% to approximately 17%, approximately 8% to approximately 16%, approximately 9% to approximately 15%, approximately 10% to approximately 14%, or approximately 11% to approximately 13%.

In another example embodiment, the adjuvant composition comprises, consists essentially of or consists of HPMC and an alginate selected from the group consisting of sodium alginate, ammonium alginate, calcium alginate and PGA. In certain example embodiments, the HPMC and the alginate are added in a 1:1 ratio. In certain example embodiments, the HPMC and alginate blend is added to aqueous solvent at a concentration of 5% to approximately 20%, approximately 5% to approximately 19%, approximately 5% to approximately 18%, approximately 5% to approximately 17%, approximately 5% to approximately 16%, approximately 5% to approximately 15%, approximately 5% to approximately 14%, approximately 5% to approximately 13%, approximately 5% to approximately 12%, approximately 5% to approximately 11%, approximately 5% to approximately 10%, approximately 5% to approximately 9%, approximately 5% to approximately 8%, approximately 5% to approximately 7%, approximately 5% to approximately 6%, approximately 6% to approximately 20%, approximately 7% to approximately 20%, approximately 8% to approximately 20%, approximately 9% to approximately 20%, 10% to approximately 20%, approximately 11% to approximately 20%, approximately 12% to approximately 20%, approximately 13% to approximately 20%, approximately 14% to approximately 20%, approximately 15% to approximately 20%, approximately 16% to approximately 20%, approximately 17% to approximately 20%, approximately 18% to approximately 20%, approximately 19% to approximately 20%, approximately 5% to approximately 19%, approximately 6% to approximately 18%, approximately 7% to approximately 17%, approximately 8% to approximately 16%, approximately 9% to approximately 15%, approximately 10% to approximately 14%, or approximately 11% to approximately 13%.

In one example embodiment, the adjuvant composition comprises, consists essentially of or consists of HPMC and konjac. In certain example embodiments, HPMC and konjac are added in a 1:1 to ratio. In certain example embodiments, the HPMC and konjac blend is added to aqueous solvent at a concentration of 5% to approximately 20%, approximately 5% to approximately 19%, approximately 5% to approximately 18%, approximately 5% to approximately 17%, approximately 5% to approximately 16%, approximately 5% to approximately 15%, approximately 5% to approximately 14%, approximately 5% to approximately 13%, approximately 5% to approximately 12%, approximately 5% to approximately 11%, approximately 5% to approximately 10%, approximately 5% to approximately 9%, approximately 5% to approximately 8%, approximately 5% to approximately 7%, approximately 5% to approximately 6%, approximately 6% to approximately 20%, approximately 7% to approximately 20%, approximately 8% to approximately 20%, approximately 9% to approximately 20%, 10% to approximately 20%, approximately 11% to approximately 20%, approximately 12% to approximately 20%, approximately 13% to approximately 20%, approximately 14% to approximately 20%, approximately 15% to approximately 20%, approximately 16% to approximately 20%, approximately 17% to approximately 20%, approximately 18% to approximately 20%, approximately 19% to approximately 20%, approximately 5% to approximately 19%, approximately 6% to approximately 18%, approximately 7% to approximately 17%, approximately 8% to approximately 16%, approximately 9% to approximately 15%, approximately 10% to approximately 14%, or approximately 11% to approximately 13%.

In one example embodiment, the adjuvant composition comprises, consists essentially of or consists of HPMC and guar gum. In certain example embodiments, the HPMC and guar gum are added in a 1:1 ratio. In certain example embodiments, the HPMC and guar gum blend is added to aqueous solvent at a concentration of approximately 5% to approximately 30%, approximately 5% to approximately 29%, approximately 5% to approximately 28%, approximately 5% to approximately 27%, approximately 5% to approximately 26%, approximately 5% to approximately 25%, approximately 5% to approximately 24%, approximately 5% to approximately 23%, approximately 5% to approximately 22%, approximately 5% to approximately 21%, approximately 5% to approximately 20%, approximately 5% to approximately 19%, approximately 5% to approximately 18%, approximately 5% to approximately 17%, approximately 5% to approximately 16%, approximately 5% to approximately 15%, approximately 5% to approximately 14%, approximately 5% to approximately 13%, approximately 5% to approximately 12%, approximately 5% to approximately 11%, approximately 5% to approximately 10%, approximately 5% to approximately 9%, approximately 5% to approximately 8%, approximately 5% to approximately 7%, approximately 5% to approximately 6%, approximately 6% to approximately 30%, approximately 7% to approximately 30%, approximately 8% to approximately 30% approximately 9% to approximately 30%, 10% to approximately 30%, approximately 11% to approximately 30%, approximately 12% to approximately 30%, approximately 13% to approximately 30%, approximately 14% to approximately 30%, approximately 15% to approximately 30%, approximately 16%, to approximately 30%, approximately 17% to approximately 30%, approximately 18% to approximately 30%, approximately 19% to approximately 30%, approximately 20% to approximately 30%, approximately 21% to approximately 30%, approximately 22% to approximately 30%, approximately 23% to approximately 30%, approximately 24% to approximately 30%, approximately 25% to approximately 30%, approximately 26% to approximately 30%, approximately 27% to approximately 30%, approximately 28% to approximately 30%, approximately 29% to approximately 30%, approximately 6% to approximately 29%, approximately 7% to approximately 28%, approximately 8% to approximately 27%, approximately 9% to approximately 26%, approximately 10% to approximately 25%, approximately 11% to approximately 24%, approximately 12% to approximately 23%, approximately 13% to approximately 22%, approximately 14% to approximately 21%, approximately 15% to approximately 20%, approximately 16% to approximately 19%, or approximately 17% to approximately 18%.

In one example embodiment, the adjuvant composition comprises, consists essentially of or consists of HPMC and xanthan gum. In certain example embodiments, HPMC and xanthan gum are added in a 1:1 to ratio. In certain example embodiments, the HPMC and xanthan gum blend is added to aqueous solvent at a concentration of approximately 5% to approximately 20%, approximately 5% to approximately 19%, approximately 5% to approximately 18%, approximately 5% to approximately 17%, approximately 5% to approximately 16%, approximately 5% to approximately 15%, approximately 5% to approximately 14%, approximately 5% to approximately 13%, approximately 5% to approximately 12%, approximately 5% to approximately 11%, approximately 5% to approximately 10%, approximately 5% to approximately 9%, approximately 5% to approximately 8%, approximately 5% to approximately 7%, approximately 5% to approximately 6%, approximately 6% to approximately 20%, approximately 7% to approximately 20%, approximately 8% to approximately 20%, approximately 9% to approximately 20%, 10% to approximately 20%, approximately 11% to approximately 20%, approximately 12% to approximately 20%, approximately 13% to approximately 20%, approximately 14% to approximately 20%, approximately 15% to approximately 20%, approximately 16% to approximately 20%, approximately 17% to approximately 20%, approximately 18% to approximately 20%, approximately 19% to approximately 20%, approximately 5% to approximately 19%, approximately 6% to approximately 18%, approximately 7% to approximately 17%, approximately 8% to approximately 16%, approximately 9% to approximately 15%, approximately 10% to approximately 14%, or approximately 11% to approximately 13%.

In one example embodiment, the adjuvant composition comprises, consists essentially of or consists of HPMC and pectin. In certain example embodiments, HPMC and pectin are added in a 1:1 to ratio. In certain example embodiments, the HPMC and pectin blend is added to aqueous solvent at a concentration of approximately 5% to approximately 40%, approximately 5% to approximately 39%, approximately 5% to approximately 38%, approximately 5% to approximately 37%, approximately 5% to approximately 36%, approximately 5% to approximately 35%, approximately 5% to approximately 34%, approximately 5% to approximately 33%, approximately 5% to approximately 32%, approximately 5% to approximately 31%, approximately 5% to approximately 30%, approximately 5% to approximately 29%, approximately 5% to approximately 28%, approximately 5% to approximately 27%, approximately 5% to approximately 26%, approximately 5% to approximately 25%, approximately 5% to approximately 24%, approximately 5% to approximately 23%, approximately 5% to approximately 22%, approximately 5% to approximately 21%, approximately 5% to approximately 20%, approximately 5% to approximately 19%, approximately 5% to approximately 18%, approximately 5% to approximately 17%, approximately 5% to approximately 16%, approximately 5% to approximately 15%, approximately 5% to approximately 14%, approximately 5% to approximately 13%, approximately 5% to approximately 12%, approximately 5% to approximately 11%, approximately 5% to approximately 10%, approximately 5% to approximately 9%, approximately 5% to approximately 8%, approximately 5% to approximately 7%, approximately 5% to approximately 6%, approximately 6% to approximately 40%, approximately 7% to approximately 40%, approximately 8% to approximately 40%, approximately 9% to approximately 40%, approximately 10% to approximately 40%, approximately 11% to approximately 40%, approximately 12% to approximately 40%, approximately 13% to approximately 40%, approximately 14% to approximately 40%, approximately 15% to approximately 40%, approximately 16% to approximately 40%, approximately 17% to approximately 40%, approximately 18% to approximately 40%, approximately 19% to approximately 40%, approximately 20% to approximately 40%, approximately 21% to approximately 40%, approximately 22% to approximately 40%, approximately 23% to approximately 40%, approximately 24% to approximately 40%, approximately 25% to approximately 40%, approximately 26% to approximately 40%, approximately 27% to approximately 40%, approximately 28% to approximately 40%, approximately 29% to approximately 40%, approximately 30% to approximately 40%, approximately 31% to approximately 40%, approximately 32% to approximately 40%, approximately 33% to approximately 40%, approximately 34% to approximately 40%, approximately 35% to approximately 40%, approximately 36% to approximately 40%, approximately 37% to approximately 40%, approximately 38% to approximately 40%, approximately 39% to approximately 40%, approximately 6% to approximately 39%, approximately 7% to approximately 38%, approximately 8% to approximately 37%, approximately 9% to approximately 36%, approximately 10% to approximately 35%, approximately 11% to approximately 34%, approximately 12% to approximately 33%, approximately 13% to approximately 32%, approximately 14% to approximately 31%, approximately 15% to approximately 30%, approximately 16% to approximately 29%, approximately 17% to approximately 28%, approximately 18% to approximately 27%, approximately 19% to approximately 26%, approximately 20% to approximately 25%, approximately 21% to approximately 24%, or approximately 22% to approximately 23%.

In one example embodiment, the adjuvant composition comprises, consists essentially of or consists of CMC and PGA. In certain example embodiments, CMC and PGA are added in a 1:1 to ratio. In certain example embodiments, the CMC and PGA blend is added to aqueous solvent at a concentration of approximately 5% to approximately 40%, approximately 5% to approximately 39%, approximately 5% to approximately 38%, approximately 5% to approximately 37%, approximately 5% to approximately 36%, approximately 5% to approximately 35%, approximately 5% to approximately 34%, approximately 5% to approximately 33%, approximately 5% to approximately 32%, approximately 5% to approximately 31%, approximately 5% to approximately 30%, approximately 5% to approximately 29%, approximately 5% to approximately 28%, approximately 5% to approximately 27%, approximately 5% to approximately 26%, approximately 5% to approximately 25%, approximately 5% to approximately 24%, approximately 5% to approximately 23%, approximately 5% to approximately 22%, approximately 5% to approximately 21%, approximately 5% to approximately 20%, approximately 5% to approximately 19%, approximately 5% to approximately 18%, approximately 5% to approximately 17%, approximately 5% to approximately 16%, approximately 5% to approximately 15%, approximately 5% to approximately 14%, approximately 5% to approximately 13%, approximately 5% to approximately 12%, approximately 5% to approximately 11%, approximately 5% to approximately 10%, approximately 5% to approximately 9%, approximately 5% to approximately 8%, approximately 5% to approximately 7%, approximately 5% to approximately 6%, approximately 6% to approximately 40%, approximately 7% to approximately 40%, approximately 8% to approximately 40%, approximately 9% to approximately 40%, approximately 10% to approximately 40%, approximately 11% to approximately 40%, approximately 12% to approximately 40%, approximately 13% to approximately 40%, approximately 14% to approximately 40%, approximately 15% to approximately 40%, approximately 16% to approximately 40%, approximately 17% to approximately 40%, approximately 18% to approximately 40%, approximately 19% to approximately 40%, approximately 20% to approximately 40%, approximately 21% to approximately 40%, approximately 22% to approximately 40%, approximately 23% to approximately 40%, approximately 24% to approximately 40%, approximately 25% to approximately 40%, approximately 26% to approximately 40%, approximately 27% to approximately 40%, approximately 28% to approximately 40%, approximately 29% to approximately 40%, approximately 30% to approximately 40%, approximately 31% to approximately 40%, approximately 32% to approximately 40%, approximately 33% to approximately 40%, approximately 34% to approximately 40%, approximately 35% to approximately 40%, approximately 36% to approximately 40%, approximately 37% to approximately 40%, approximately 38% to approximately 40%, approximately 39% to approximately 40%, approximately 6% to approximately 39%, approximately 7% to approximately 38%, approximately 8% to approximately 37%, approximately 9% to approximately 36%, approximately 10% to approximately 35%, approximately 11% to approximately 34%, approximately 12% to approximately 33%, approximately 13% to approximately 32%, approximately 14% to approximately 31%, approximately 15% to approximately 30%, approximately 16% to approximately 29%, approximately 17% to approximately 28%, approximately 18% to approximately 27%, approximately 19% to approximately 26%, approximately 20% to approximately 25%, approximately 21% to approximately 24%, or approximately 22% to approximately 23%.

In one example embodiment, the adjuvant composition comprises, consists essentially of or consists of PGA and konjac. In certain example embodiments, PGA and konjac are added in a 1:1 to ratio. In certain example embodiments, the PGA and konjac blend is added to aqueous solvent at a concentration of approximately 5% to approximately 20%, approximately 5% to approximately 19%, approximately 5% to approximately 18%, approximately 5% to approximately 17%, approximately 5% to approximately 16%, approximately 5% to approximately 15%, approximately 5% to approximately 14%, approximately 5% to approximately 13%, approximately 5% to approximately 12%, approximately 5% to approximately 11%, approximately 5% to approximately 10%, approximately 5% to approximately 9%, approximately 5% to approximately 8%, approximately 5% to approximately 7%, approximately 5% to approximately 6%, approximately 6% to approximately 20%, approximately 7% to approximately 20%, approximately 8% to approximately 20%, approximately 9% to approximately 20%, 10% to approximately 20%, approximately 11% to approximately 20%, approximately 12% to approximately 20%, approximately 13% to approximately 20%, approximately 14% to approximately 20%, approximately 15% to approximately 20%, approximately 16% to approximately 20%, approximately 17% to approximately 20%, approximately 18% to approximately 20%, approximately 19% to approximately 20%, approximately 5% to approximately 19%, approximately 6% to approximately 18%, approximately 7% to approximately 17%, approximately 8% to approximately 16%, approximately 9% to approximately 15%, approximately 10% to approximately 14%, or approximately 11% to approximately 13%.

In one example embodiment, the adjuvant composition comprises, consists essentially of or consists of PGA and guar gum. In certain example embodiments, the PGA and guar gum are added in a 1:1 ratio. In certain example embodiments, the PGA and guar gum blend is added to aqueous solvent at a concentration of approximately 5% to approximately 30%, approximately 5% to approximately 29%, approximately 5% to approximately 28%, approximately 5% to approximately 27%, approximately 5% to approximately 26%, approximately 5% to approximately 25%, approximately 5% to approximately 24%, approximately 5% to approximately 23%, approximately 5% to approximately 22%, approximately 5% to approximately 21%, approximately 5% to approximately 20%, approximately 5% to approximately 19%, approximately 5% to approximately 18%, approximately 5% to approximately 17%, approximately 5% to approximately 16%, approximately 5% to approximately 15%, approximately 5% to approximately 14%, approximately 5% to approximately 13%, approximately 5% to approximately 12%, approximately 5% to approximately 11%, approximately 5% to approximately 10%, approximately 5% to approximately 9%, approximately 5% to approximately 8%, approximately 5% to approximately 7%, approximately 5% to approximately 6%, approximately 6% to approximately 30%, approximately 7% to approximately 30%, approximately 8% to approximately 30% approximately 9% to approximately 30%, 10% to approximately 30%, approximately 11% to approximately 30%, approximately 12% to approximately 30%, approximately 13% to approximately 30%, approximately 14% to approximately 30%, approximately 15% to approximately 30%, approximately 16%, to approximately 30%, approximately 17% to approximately 30%, approximately 18% to approximately 30%, approximately 19% to approximately 30%, approximately 20% to approximately 30%, approximately 21% to approximately 30%, approximately 22% to approximately 30%, approximately 23% to approximately 30%, approximately 24% to approximately 30%, approximately 25% to approximately 30%, approximately 26% to approximately 30%, approximately 27% to approximately 30%, approximately 28% to approximately 30%, approximately 29% to approximately 30%, approximately 6% to approximately 29%, approximately 7% to approximately 28%, approximately 8% to approximately 27%, approximately 9% to approximately 26%, approximately 10% to approximately 25%, approximately 11% to approximately 24%, approximately 12% to approximately 23%, approximately 13% to approximately 22%, approximately 14% to approximately 21%, approximately 15% to approximately 20%, approximately 16% to approximately 19%, or approximately 17% to approximately 18%.

In one example embodiment, the adjuvant composition comprises, consists essentially of or consists of PGA and xanthan. In certain example embodiments, PGA and xanthan gum are added in a 1:1 ratio. In certain example embodiments, the PGA and xanthan gum blend is added to aqueous solvent at a concentration of approximately 5% to approximately 20%, approximately 5% to approximately 19%, approximately 5% to approximately 18%, approximately 5% to approximately 17%, approximately 5% to approximately 16%, approximately 5% to approximately 15%, approximately 5% to approximately 14%, approximately 5% to approximately 13%, approximately 5% to approximately 12%, approximately 5% to approximately 11%, approximately 5% to approximately 10%, approximately 5% to approximately 9%, approximately 5% to approximately 8%, approximately 5% to approximately 7%, approximately 5% to approximately 6%, approximately, approximately 6% to approximately 20%, approximately 7% to approximately 20%, approximately 8% to approximately 20%, approximately 9% to approximately 20%, 10% to approximately 20%, approximately 11% to approximately 20%, approximately 12% to approximately 20%, approximately 13% to approximately 20%, approximately 14% to approximately 20%, approximately 15% to approximately 20%, approximately 16% to approximately 20%, approximately 17% to approximately 20%, approximately 18% to approximately 20%, approximately 19% to approximately 20%, approximately 5% to approximately 19%, approximately 6% to approximately 18%, approximately 7% to approximately 17%, approximately 8% to approximately 16%, approximately 9% to approximately 15%, approximately 10% to approximately 14%, or approximately 11% to approximately 13%.

In one example embodiment, the adjuvant composition comprises, consists essentially of or consists of PGA and pectin. In certain example embodiments, PGA and pectin are added in a 1:1 to ratio. In certain example embodiments, the PGA and pectin blend is added to aqueous solvent at a concentration of approximately 5% to approximately 40%, approximately 5% to approximately 39%, approximately 5% to approximately 38%, approximately 5% to approximately 37%, approximately 5% to approximately 36%, approximately 5% to approximately 35%, approximately 5% to approximately 34%, approximately 5% to approximately 33%, approximately 5% to approximately 32%, approximately 5% to approximately 31%, approximately 5% to approximately 30%, approximately 5% to approximately 29%, approximately 5% to approximately 28%, approximately 5% to approximately 27%, approximately 5% to approximately 26%, approximately 5% to approximately 25%, approximately 5% to approximately 24%, approximately 5% to approximately 23%, approximately 5% to approximately 22%, approximately 5% to approximately 21%, approximately 5% to approximately 20%, approximately 5% to approximately 19%, approximately 5% to approximately 18%, approximately 5% to approximately 17%, approximately 5% to approximately 16%, approximately 5% to approximately 15%, approximately 5% to approximately 14%, approximately 5% to approximately 13%, approximately 5% to approximately 12%, approximately 5% to approximately 11%, approximately 5% to approximately 10%, approximately 5% to approximately 9%, approximately 5% to approximately 8%, approximately 5% to approximately 7%, approximately 5% to approximately 6%, approximately 6% to approximately 40%, approximately 7% to approximately 40%, approximately 8% to approximately 40%, approximately 9% to approximately 40%, approximately 10% to approximately 40%, approximately 11% to approximately 40%, approximately 12% to approximately 40%, approximately 13% to approximately 40%, approximately 14% to approximately 40%, approximately 15% to approximately 40%, approximately 16% to approximately 40%, approximately 17% to approximately 40%, approximately 18% to approximately 40%, approximately 19% to approximately 40%, approximately 20% to approximately 40%, approximately 21% to approximately 40%, approximately 22% to approximately 40%, approximately 23% to approximately 40%, approximately 24% to approximately 40%, approximately 25% to approximately 40%, approximately 26% to approximately 40%, approximately 27% to approximately 40%, approximately 28% to approximately 40%, approximately 29% to approximately 40%, approximately 30% to approximately 40%, approximately 31% to approximately 40%, approximately 32% to approximately 40%, approximately 33% to approximately 40%, approximately 34% to approximately 40%, approximately 35% to approximately 40%, approximately 36% to approximately 40%, approximately 37% to approximately 40%, approximately 38% to approximately 40%, approximately 39% to approximately 40%, approximately 6% to approximately 39%, approximately 7% to approximately 38%, approximately 8% to approximately 37%, approximately 9% to approximately 36%, approximately 10% to approximately 35%, approximately 11% to approximately 34%, approximately 12% to approximately 33%, approximately 13% to approximately 32%, approximately 14% to approximately 31%, approximately 15% to approximately 30%, approximately 16% to approximately 29%, approximately 17% to approximately 28%, approximately 18% to approximately 27%, approximately 19% to approximately 26%, approximately 20% to approximately 25%, approximately 21% to approximately 24%, or approximately 22% to approximately 23%.

In one example embodiment, the adjuvant composition comprises, consists essentially of or consists of gum acacia and xanthan gum. In certain example embodiments, MGA may be substituted for gum acacia. In certain example embodiments, gum acacia or MGA is added to the adjuvant composition at a concentration of approximately 30% to approximately 60%, approximately 30% to approximately 59%, approximately 30% to approximately 58%, approximately 30% to approximately 57%, approximately 30% to approximately 56%, approximately 30% to approximately 55%, approximately 30% to approximately 54%, approximately 30% to approximately 53%, approximately 30% to approximately 52%, approximately 30% to approximately 51%, approximately 30% to approximately 50%, approximately 30% to approximately 49%, approximately 30% to approximately 48%, approximately 30% to approximately 47%, approximately 30% to approximately 46%, approximately 30% to approximately 45%, approximately 30% to approximately 44%, approximately 30% to approximately 43%, approximately 30% to approximately 42%, approximately 30% to approximately 41%, approximately 30% to approximately 40%, approximately 30% to approximately 39%, approximately 30% to approximately 38%, approximately 30% to approximately 37%, approximately 30% to approximately 36%, approximately 30% to approximately 35%, approximately 30% to approximately 34%, approximately 30% to approximately 33%, approximately 30% to approximately 32%, approximately 30% to approximately 31%, approximately 31% to approximately 60%, approximately 32% to approximately 60%, approximately 33% to approximately 60%, approximately 34% to approximately 60%, approximately 35% to approximately 60%, approximately 36% to approximately 60%, approximately 37% to approximately 60%, approximately 38% to approximately 60%, approximately 39% to approximately 60%, approximately 40% to approximately 60%, approximately 41% to approximately 60%, approximately 42% to approximately 60%, approximately 43% to approximately 60%, approximately 44% to approximately 60%, approximately 45% to approximately 46%, approximately 47% to approximately 60%, approximately 48% to approximately 60%, approximately 49% to approximately 60%, approximately 50% to approximately 60%, approximately 51% to approximately 60%, approximately 52% to approximately 60%, approximately 53% to approximately 60%, approximately 54% to approximately 60%, approximately 55% to approximately 60%, approximately 56% to approximately 60%, approximately 57% to approximately 60%, approximately 58% to approximately 60%, approximately 59% to approximately 60%, approximately 31% to approximately 59%, approximately 32% to approximately 58%, approximately 33% to approximately 57%, approximately 34% to approximately 56%, approximately 35% to approximately 55%, approximately 36% to approximately 54%, approximately 37% to approximately 53%, approximately 38% to approximately 52%, approximately 39% to approximately 51%, approximately 40% to approximately 50%, approximately 41% to approximately 49%, approximately 42% to approximately 48%, approximately 43% to approximately 47%, or approximately 44% to approximately 46%.

In certain example embodiments, xanthan gum is added to the adjuvant composition at a concentration of approximately 5% to approximately 20%, approximately 5% to approximately 19%, approximately 5% to approximately 18%, approximately 5% to approximately 17%, approximately 5% to approximately 16%, approximately 5% to approximately 15%, approximately 5% to approximately 14%, approximately 5% to approximately 13%, approximately 5% to approximately 12%, approximately 5% to approximately 11%, approximately 5% to approximately 10%, approximately 5% to approximately 9%, approximately 5% to approximately 8%, approximately 5% to approximately 7%, approximately 5% to approximately 6%, approximately 6% to approximately 20%, approximately 7% to approximately 20%, approximately 8% to approximately 20%, approximately 9% to approximately 20%, 10% to approximately 20%, approximately 11% to approximately 20%, approximately 12% to approximately 20%, approximately 13% to approximately 20%, approximately 14% to approximately 20%, approximately 15% to approximately 20%, approximately 16% to approximately 20%, approximately 17% to approximately 20%, approximately 18% to approximately 20%, approximately 19% to approximately 20%, approximately 5% to approximately 19%, approximately 6% to approximately 18%, approximately 7% to approximately 17%, approximately 8% to approximately 16%, approximately 9% to approximately 15%, approximately 10% to approximately 14%, or approximately 11% to approximately 13%.

Any of the preceding formulations may be diluted into a final tank mix concentration ranging from 0.005% to 0.04% depending on the gum compositions selected. Tank mix concentration selection will be dictated by the user at the site of application immediately prior to use. All subranges within the range recited in this paragraph are conceivably useful, and each mix should be customized based on temperature, relative humidity, spray application method, and any other factor that reasonably should be considered when following use instructions provided by the applicant on its commercial products.

It is recognized and expected that certain other gums may be readily substituted or added in addition to the above described embodiments. Additional gums that may be substituted or used in addition to those described above include beta glucan, gum ghatti, locust bean gum, gellan gum, larch gum, gum karaya, tara gum, tragacanth, fenugreek, agar, pullulan, and flaxseed gum.

Depending on the gums used, an aqueous pesticidal adhesive formulation of the present invention may exhibit a static single-point viscosity of 1-1500 centipoise (cP), 5-1400 cP, 10-1300 cP, 20-1000 cP, 50-750 cP, 100-600 cP, 200-500 cP, or 300-400 cP. Alternatively, static single-point viscosity may be 1-750 cP, 5-700 cP, 10-650 cP, 20-600 cP, 25-550 cP, 30-540 cP, 35-525 cP, 40-500 cP, 50-400 cP, 75-300 cP or 100-200 cP. Alternatively, static single-point viscosity may be 750-1500 cP, 800-1400 cP, 900-1300 cP, 1000-1250 cP or 1050-1200 cP.

What is claimed is:

1. A method of reducing the number of live insect or arachnid pests on a target plant, the method comprising:
   preparing a gum concentrate comprising an effective amount of at least one gum selected from the group consisting of xanthan gum, konjac, carboxymethylcellulose, hydroxypropyl methylcellulose, carrageenan, propylene glycol alginate, methylcellulose, gum acacia, pectin and combinations thereof; and
   diluting the gum concentrate in an aqueous solvent to form an aqueous pesticide; and
   spraying the aqueous pesticide through a spray nozzle under a pressure of 15 to 175 pounds per square inch onto the target plant to form spray droplets adhered thereto, wherein the insect or arachnid pests contact the spray droplets, which remain substantially globular and do not form a film, resulting in their entrapment therein; and
   wherein no agrochemical or surfactant is added to the aqueous pesticide.

2. The method of claim 1, wherein the concentration of the at least one gum in the gum concentrate is 0.05-30% w/v.

3. The method of claim 1, wherein the concentration of the at least one gum in the aqueous pesticide is 0.0375-0.15% w/v.

4. The method of claim 1, wherein the spray droplets are resistant to evaporation.

5. The method of claim 1, wherein the gum concentrate further comprises at least one sugar alcohol selected from the group consisting of arabitol, erythritol, glycerol, isomalt, lactitol, mannitol, sorbitol, xylitol and combinations thereof.

6. The method of claim 5, wherein the concentration of the at least one sugar alcohol in the aqueous concentrate is 0.6-50% w/v.

7. The method of claim 5, wherein the spray droplets are resistant to evaporation.

8. The method of claim 1, wherein the at least one gum comprises xanthan gum, konjac and gum acacia.

9. The method of claim 5, wherein the at least one gum comprises xanthan gum, konjac and gum acacia.

10. The method of claim 1, wherein the at least one gum comprises xanthan gum, carboxymethylcellulose and gum acacia.

11. The method of claim 5, wherein the at least one gum comprises xanthan gum, carboxymethylcellulose and gum acacia.

12. The method of claim 1, wherein the number of live insect or arachnid pests on the target plant is reduced by at least 50%.

13. A method of reducing the number of insect or arachnid pests on a target plant, the method comprising:
    applying spray droplets according to claim 1 to a target plant through a spray nozzle at a pressure of 15-175 pounds per square inch;

wherein the applied spray droplets define a plurality of substantially globular pesticidal adhesive areas of at least 100 microns in diameter without defining a film; and wherein at least one target pest present within the target plant area encounters at least one pesticidal adhesive area and is permanently immobilized.

\* \* \* \* \*